US009800589B1

(12) United States Patent
Asveren et al.

(10) Patent No.: US 9,800,589 B1
(45) Date of Patent: Oct. 24, 2017

(54) METHODS AND APPARATUS FOR DETECTING MALICIOUS ATTACKS

(71) Applicant: Sonus Networks, Inc., Westford, MA (US)

(72) Inventors: Tolga Asveren, Bordentown, NJ (US); Shaun Jaikarran Bharrat, Manalapan, NJ (US)

(73) Assignee: SONUS NETWORKS, INC., Westford, MA (US)

(*) Notice: Subject to any disclaimer, the term of this patent is extended or adjusted under 35 U.S.C. 154(b) by 669 days.

(21) Appl. No.: 13/974,036

(22) Filed: Aug. 22, 2013

(51) Int. Cl.
*H04L 29/06* (2006.01)

(52) U.S. Cl.
CPC ................ *H04L 63/1408* (2013.01)

(58) Field of Classification Search
CPC ............. H04L 63/1408; H04L 63/1416; H04L 63/1425; H04L 63/1433
USPC .......................................................... 726/23
See application file for complete search history.

(56) References Cited

U.S. PATENT DOCUMENTS

| | | | | |
|---|---|---|---|---|
| 7,069,000 B1 * | 6/2006 | Corson | ................ | H04L 63/08 455/410 |
| 7,441,429 B1 * | 10/2008 | Nucci | ................ | H04L 63/1416 370/230 |
| 7,568,224 B1 * | 7/2009 | Jennings | ................ | H04L 63/126 713/161 |
| 7,844,815 B2 * | 11/2010 | Bajko | ................ | H04L 63/108 709/228 |
| 7,979,903 B2 * | 7/2011 | Kwan | ................ | H04L 63/0236 726/22 |
| 8,464,329 B2 * | 6/2013 | Fogel | ................ | H04L 29/06027 380/264 |
| 8,522,349 B2 * | 8/2013 | Crume | ................ | H04L 63/1441 705/51 |
| 8,955,090 B2 * | 2/2015 | Bessis | ................ | H04L 9/3271 709/220 |

(Continued)

FOREIGN PATENT DOCUMENTS

JP    EP 2202938 A1 *    6/2010    ......... H04L 63/1458

OTHER PUBLICATIONS

3rd Generation Partnership Project; Technical Specification Group Services and System Aspects; Security aspects of early IP Multimedia Subsystem (IMS)(Release 6): 3GPP TR 33.978 v6.6.0 (Dec. 2006), pp. 1-27.*

(Continued)

*Primary Examiner* — Samson Lemma
*Assistant Examiner* — Carlos Amorin
(74) *Attorney, Agent, or Firm* — Stephen T. Straub; Ronald P. Straub; Michael P. Straub

(57) ABSTRACT

Methods and apparatus for detecting VOIP spoofing attacks in systems that provide communication services over IP networks, for gathering information that can be used for preventing or mitigating future malicious attacks, are described. The methods and apparatus send various signals and check for expected responses. Actual responses and/or lack of responses to signals, e.g., messages, are detected, logged and used for making decisions as well as generating a record for informational purposes and analysis which can facilitate identification of common features of malicious packets and/or messages. The methods are well suited for use in a session border controller.

20 Claims, 19 Drawing Sheets

(56) References Cited

U.S. PATENT DOCUMENTS

| | | | | |
|---|---|---|---|---|
| 2003/0154243 A1* | 8/2003 | Crockett | ................ | H04L 63/08 709/203 |
| 2007/0298794 A1* | 12/2007 | Cho | ..................... | H04W 60/00 455/435.1 |
| 2008/0222724 A1* | 9/2008 | Ormazabal | ......... | H04L 63/1458 726/23 |
| 2008/0285468 A1* | 11/2008 | Seo | .................... | H04L 63/1416 370/242 |
| 2009/0006841 A1* | 1/2009 | Ormazabal | ......... | H04L 63/1458 713/152 |
| 2009/0216842 A1* | 8/2009 | Risher | ................. | G06Q 10/107 709/206 |
| 2009/0288165 A1* | 11/2009 | Qiu | ....................... | G06F 21/552 726/23 |
| 2010/0146061 A1* | 6/2010 | Mattsson | .................. | G01J 9/02 709/206 |
| 2011/0019547 A1* | 1/2011 | De Lutiis | .......... | H04L 29/12207 370/231 |
| 2011/0173697 A1* | 7/2011 | Kurapati | ............. | H04L 63/1458 726/22 |
| 2012/0174217 A1* | 7/2012 | Ormazabal | ......... | H04L 63/1458 726/22 |
| 2012/0207157 A1* | 8/2012 | Tu | ....................... | H04L 12/5695 370/389 |
| 2012/0210421 A1* | 8/2012 | Ormazabal | ........... | H04L 63/123 726/22 |
| 2012/0213082 A1* | 8/2012 | Carney | ............... | H04L 63/1466 370/241 |
| 2013/0332552 A1* | 12/2013 | Yanovsky | ............... | H04L 51/04 709/206 |
| 2014/0068710 A1* | 3/2014 | Lau | ......................... | G06F 21/00 726/3 |

OTHER PUBLICATIONS

Network Working Group/Request for Comments: 3261: SIP: Session Initiation Protocol, Jun. 2002; //https://www.ietf.org/rfc/rfc3261.txt//; pp. 1-269.*

Bremler-Barr et al., "Unregister Attacks in SIP", Secure Network Protocols, 2006. 2nd IEEE Workshop on. IEEE, 2006.*

* cited by examiner

| | IP ADDRESS | PORT NUMBER | RECEIVED MESSAGE TYPE | TIME OF RECEIPT | OUTCOME OF SPOOFING CHECK | ACTION |
|---|---|---|---|---|---|---|
| 1720 | 198.0.X.X | 0125XX | REGISTRATION | 21:49:23 | EXPECTED RESPONSES RECEIVED | ALLOW TO PROCEED, MARK IP ADDRESS/PORT COMBINATION LEGITIMATE |
| | | 1234XX | INVITE | 21:55:30 | EXPECTED RESPONSES NOT RECEIVED BUT REPLY FOR SIP REQUEST RECEIVED | DO NOT RESPOND, MARK IP ADDRESS/PORT COMBINATION SUSPECT |
| | | 1234XY | INVITE | 21:57:20 | EXPECTED RESPONSES RECEIVED | ALLOW TO PROCEED, MARK IP ADDRESS/PORT COMBINATION LEGITIMATE |
| 1722 | 192.0.2.Y | 0125XX | REGISTRATION | 22:35:23 | EXPECTED RESPONSES NOT RECEIVED BUT REPLY FOR SIP REQUEST RECEIVED | DO NOT RESPOND, MARK IP ADDRESS/PORT COMBINATION SUSPECT |
| | | 0125XX | REGISTRATION | 22:38:54 | EXPECTED RESPONSES NOT RECEIVED AND REPLY FOR SIP REQUEST NOT RECEIVED | BLACKLIST, MARK AS INVALID IP ADDRESS/PORT COMBINATION |
| | | 1234XY | INVITE | 22:42:30 | EXPECTED RESPONSES NOT RECEIVED AND REPLY FOR SIP REQUEST NOT RECEIVED | BLACKLIST, MARK AS INVALID IP ADDRESS/PORT COMBINATION |
| 1724 | 192.0.Y.X | 1234XY | REGISTRATION | 22:45:23 | EXPECTED RESPONSES NOT RECEIVED AND REPLY FOR SIP REQUEST NOT RECEIVED | BLACKLIST, MARK AS INVALID IP ADDRESS/PORT COMBINATION |
| | | 1234XY | REGISTRATION | 22:46:54 | EXPECTED RESPONSES NOT RECEIVED AND REPLY FOR SIP REQUEST NOT RECEIVED | BLACKLIST, MARK AS INVALID IP ADDRESS/PORT COMBINATION |
| | | 1234XY | REGISTRATION | 22:47:30 | EXPECTED RESPONSES NOT RECEIVED AND REPLY FOR SIP REQUEST RECEIVED | DO NOT RESPOND, MARK IP ADDRESS/PORT COMBINATION SUSPECT |
| | ⋮ | ⋮ | ⋮ | ⋮ | ⋮ | ⋮ |

FIG. 17

METHODS AND APPARATUS FOR DETECTING MALICIOUS ATTACKS

FIELD OF INVENTION

The present invention relates to methods and apparatus for detecting malicious attacks, more particularly to methods and apparatus for detecting VOIP spoofing and/or attacks in systems that provide communication services over IP networks and gathering information that can be used for preventing future attacks and/or determining how future calls and/or requests received at the device should be handled to mitigate the possible affects of an attack.

BACKGROUND OF THE INVENTION

Like various services providing access over public IP networks, VoIP (Voice over IP) networks providing communications over IP network services are also subject to various types of malicious attacks. These malicious attacks may utilize a strategy called spoofing, where the source IP Address/port of the packet carrying the offensive message is not the actual source IP Address/port of the actual sender of the message. Alternatively, the malicious attacks may involve attacks where the source IP Address/port may be accurate but the attaching device ignores responses to a message and continues to send messages in an attempt to overwhelm, e.g., flood, the device being attached. Other types of malicious attacks are also possible. It should be appreciated that flooding attacks may but need not involve spoofing.

In the case of spoofed messages the message header is forged by a device so that the message appears to have originated from someone or somewhere other than the actual source. Often such forgery is used by malicious devices and/or distributors of spam in an attempt to get the recipients to open, and possibly even respond to, their solicitations.

Although some spoofed messages may not cause serious harm to the receiving device, many malicious spoofed messages can cause serious problems and security risks, e.g., causing disclosure of sensitive data, passwords, financial and/or other personal information. In any case for a system and/or service provider providing services over IP networks the information such as the source IP Address/port of the spoofed message would be a valuable piece of information for analysis of attacks to know whether spoofing is applied.

From the above discussion it should be appreciated that there is a need for methods and apparatus for detecting and/or determining if a device, network and/or system is under a spoofing or other malicious attack. It would be desirable that such methods and apparatus can gather useful information which can be used in determining how future calls and/or requests received at the device should be handled and/or which would facilitate actions that can be used to reduce or mitigate future or ongoing malicious attacks.

SUMMARY OF THE INVENTION

Various features relating to methods and apparatus for detecting VOIP attacks, e.g., spoofing, flooding and/or other types of malicious attacks, in systems that provide services over IP networks and gathering information that can be used for preventing future spoofing attacks, are described. Various mechanisms for determining whether spoofing, flooding and/or other malicious attacks are used to detect VoIP attacks. The described mechanisms can, and in some embodiments are, used in a system where a connectionless transport protocol like UDP (User Datagram Protocol) is used.

One aspect of some embodiments of the invention relies on sending messages to the IP Address/port seen as the source of the attack, in the context of an existing dialog/transaction, which trigger certain replies from the recipient that receives the messages. In accordance with one feature of some embodiments it can be concluded that no IP spoofing or other malicious attack is going on if expected messages are received. If expected messages are not received, either IP spoofing indeed was used or the entity receiving the messages just ignored them. One of the objective of some embodiments of the invention is to gather as much information as possible about offending IP address/port pairs and use the information to create a knowledgebase that can be used for preventing future malicious attacks, e.g., spoofing or flooding attacks, and/or determining how future calls and/or requests received at the device should be handled.

While explained using a spoofing attack as an example of a malicious attack which can and is detected in some embodiments, the methods and apparatus of the present invention also apply to flooding and other types of attacks and are not limited to the spoofing example.

In accordance with one aspect of the invention, when a malformed INVITE request is received an exemplary session border controller (SBC) implemented in accordance with the invention sends an UPDATE as part of the same dialog. This update message is sent to the source IP of the packet carrying INVITE. If INVITE request is spoofed, i.e., if the source IP address is forged, the receiving device will reply with an error response indicating that it does not know such a dialog. If the INVITE request is genuine, i.e., source address corresponds to the original sender, the device receiving the update message will reply with a positive/success response, e.g., 200 OK.

In another embodiment a redirection response such as a 3xx message is sent by the SBC to redirect the call on another port of the same SBC. In such a case the Spoofer, e.g., an attacker device, won't receive the 3xx message and wouldn't be able to send INVITE to the new port and that would be an indication of spoofing.

In accordance with one feature of some embodiments when malformed/abandoned REGISTER messages (e.g., no REGISTER with credentials is sent upon challenge) are received by the SBC, the SBC includes IP addresses used in such REGISTER messages to a suspect list. When a new REGISTER is received from an address in the suspect list, the SBC replies with a positive reply, e.g., 200 OK, with an expiration value, e.g., a time period of 1 second. The reply is sent to the source IP of the packet carrying the REGISTER message. If the REGISTER message is spoofed, the receiving device does not send a new REGISTER message as it only received the reply 200 (REGISTER) and drops it. If the REGISTER message is not spoofed, the device receiving the reply sends a refresh/renewed REGISTER message that would be received prior to the expiration time period, e.g., 1 second. Upon receiving the renewed REGISTER message the SBC can send the REGISTER message to the SIP Registrar.

An exemplary method of operating a communications device in accordance with an exemplary embodiment, comprises: receiving a first invite message including sender contact information including a sender address; sending a message directed to said sender address in response to said first invite message; monitoring for a period of time to detect receipt of a response to said message directed to said sender address; making, when said monitoring detects receipt of a response to said message directed to said sender address, a determination as to whether said first invite message does not correspond to a spoofing operation or may correspond to a malicious operation, e.g., a spoofing operation, based on the detected response; and making, when said monitoring does not detect a response to said message directed to said sender address, a determination that said received first invite message may correspond to a malicious operation, e.g., a spoofing operation or flooding operation.

In the event an expected response is not received, in some but not all embodiments a message is sent to the IP address and/or port combination indicated in a received messaged which is believed to be malicious, to determine if a device is present at the IP address/port to which the message is sent. The message may be and sometimes is, a SIP invite or other signal to which a device is expected to send a response. In some embodiments, failure or receipt of a response to such a test message is noted and included in the network information database that is generated in accordance with the present invention allowing the database to not only reflect the fact that a malicious message was detected with a particular IP/Port address as a source address but also whether or not a device was detected as being present at the IP/Port address as indicated by whether or not a response was received to a test message sent to the IP address and Port combination which is the indicated source of a malicious message.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 17 illustrates an exemplary database including information corresponding to various IP addresses and/or IP address/port pairs which have been included in the messages, e.g., REGISTRATION, INVITE etc., processed by an exemplary session border controller.

DETAILED DESCRIPTION

Figure 1:
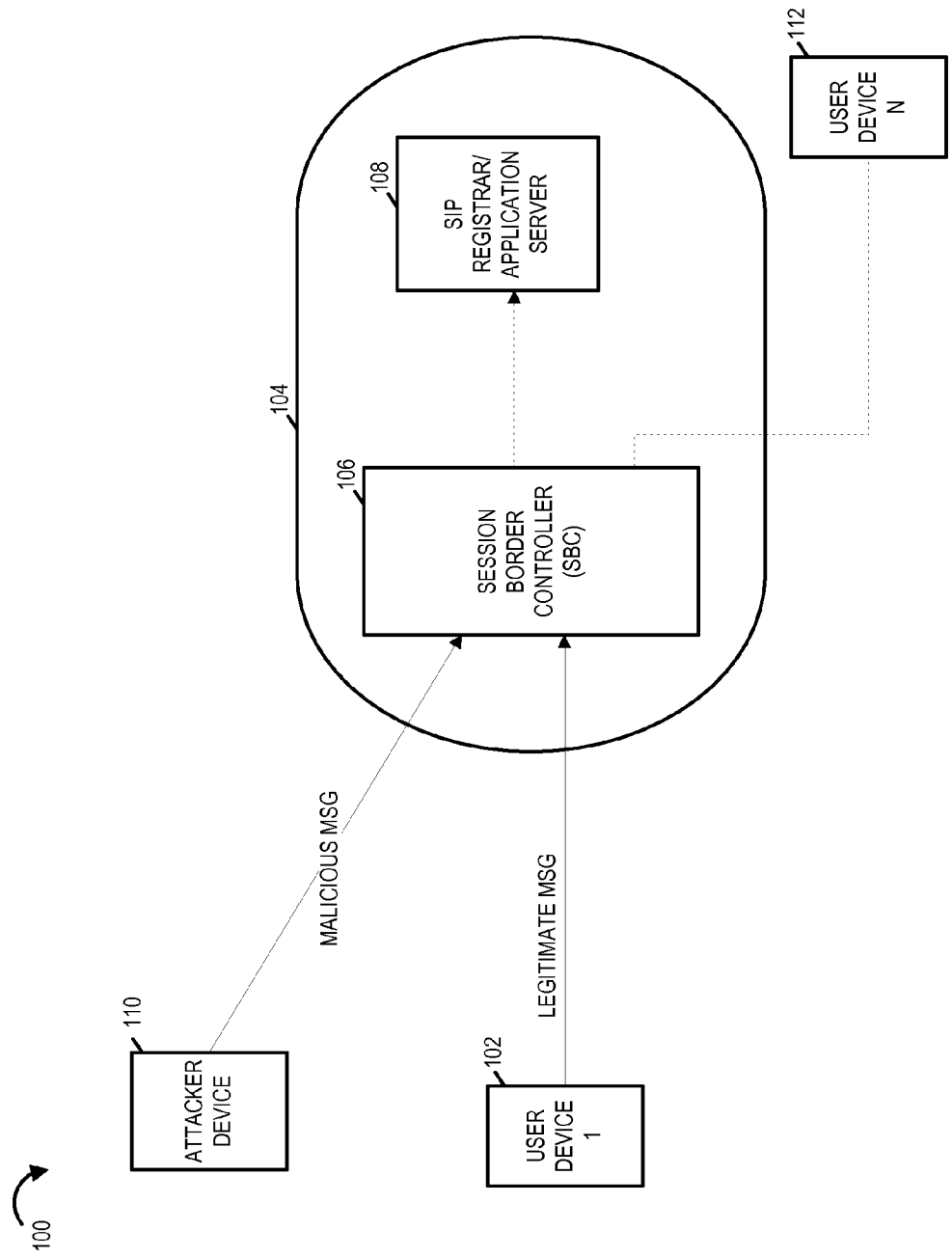
FIG. 1 illustrates an exemplary system 100 implemented in accordance with an exemplary embodiment of the invention.

FIG. 1 illustrates an exemplary system 100 in accordance with an exemplary embodiment. System 100 includes a plurality of user devices, a network 104 with network elements including a session border controller (SBC) 106 and an SIP registration server/application server 108, and an attacker device 110. The SIP registration server is also referred to as SIP registrar. The plurality of user devices include user device 1 102 and user device N 112. Each user device is, e.g., a mobile or stationary communications device that supports SIP signaling and is capable of communicating over an IP network. The attacker device 110 may be similar to the user devices 102, 112 and supports SIP signaling as well as communications over an IP network. Thus in various embodiments various user devices such as the ones shown in FIG. 1 include an SIP user agent. In some embodiments the exemplary session border controller (SBC) 106 and the SIP registration server/application server 108 are located at an operator/service provider's site. In various embodiments the devices in the system 100 communicate using UDP (User Datagram Protocol).

During normal operation a user device, e.g., user device 1 102, in the system 100 may want to establish communications with another user device such as user device N 112. The user device 1 102 that initiates the process to establish communications, e.g., by dialing other party's number and placing the call is sometimes referred to as the calling party while the other user device N 112 which is being called is referred to as the called party.

As part of a call setup/establishment when the calling party, e.g., user device 1 102, attempts to place a call to the called party, a request in sent by the user device which is received by the SBC 108 before it is allowed to reach other system elements, e.g., such as SIP registration server/application server 108, that facilitate call establishment. For example a registration request message and/or an invite message may be sent from the user device 1 102 which is intercepted by the SBC 106. The legitimate message shown in the FIG. 1 example is one such message.

When the attacker device 110 attempts a spoofing or other attack such as a flooding attack on a system/network, it sends malicious messages to a network server, e.g., in order to bring down the network and make it unresponsive. The source IP address/port of a packet carrying a malicious message in not the actual IP address/port of the actual sender which in this case is the attacker but rather be a IP address/port corresponding to another user device which may be a valid/legitimate user device. The attacker device 110 by some means obtains such IP addresses/port numbers corresponding to other user devices and uses them to send the malicious messages. Alternatively, the attacker may use its own address and simply send numerous message ignoring the responses in a malicious attempt to flood the device to which the malicious messages are sent.

In accordance with one feature of various embodiments the exemplary session border controller SBC 108 intercepts the request messages from various devices and performs a spoofing check in order to determine if a received message is an attempt of or part of a malicious attack. A spoofing attack will be used as an example of a malicious attack but it should be appreciated that the methods and apparatus of the invention can be used with regard to other types of malicious attacks as well such as flooding attacks. As discussed later, in accordance with various embodiments one or more spoofing attack checks are performed to determine if spoofing had occurred. In some embodiments when spoofing attack is detected the SBC 106 does not allow further processing of the received message and stores information regarding the source of the message. In some embodiments when it is determined that no spoofing occurred, the SBC 106 allows the call establishment to proceed in the normal manner and the registration and/or invite messages from the calling party are allowed to reach the SIP registrar/application server 108 and/or other network elements for processing. The SIP registrar/application server 108 registers the calling party's user device, e.g., user device 1 102, facilitates call establishment and provides services, e.g., voicemail services, call setup etc.

Figures 2, 2A, 2B:
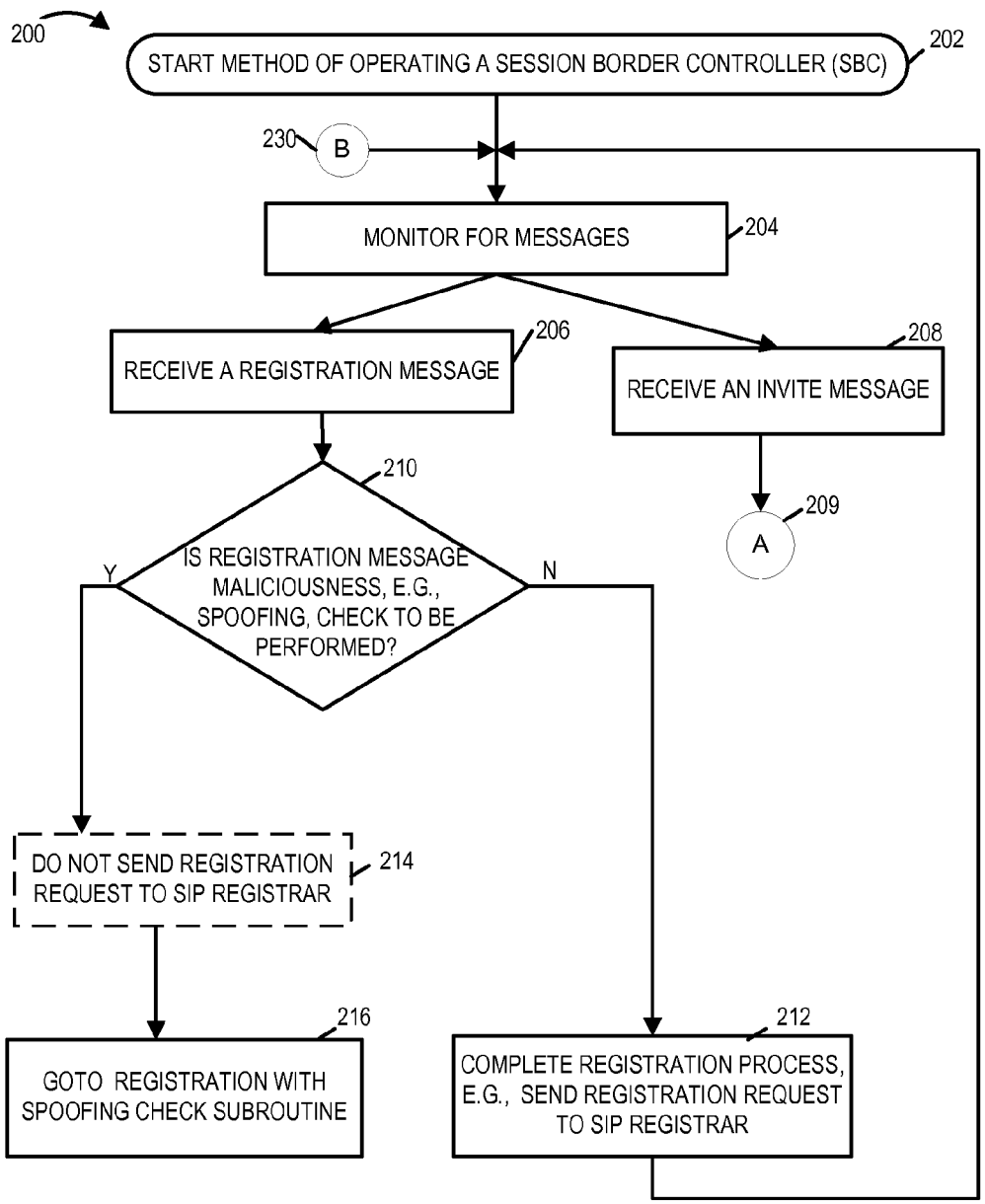
FIG. 2, which comprises the combination of FIGS. 2A and 2B, is a flowchart of an exemplary method of operating a Session Border Controller (SBC) in accordance with one embodiment of the present invention.
Figure 2B:
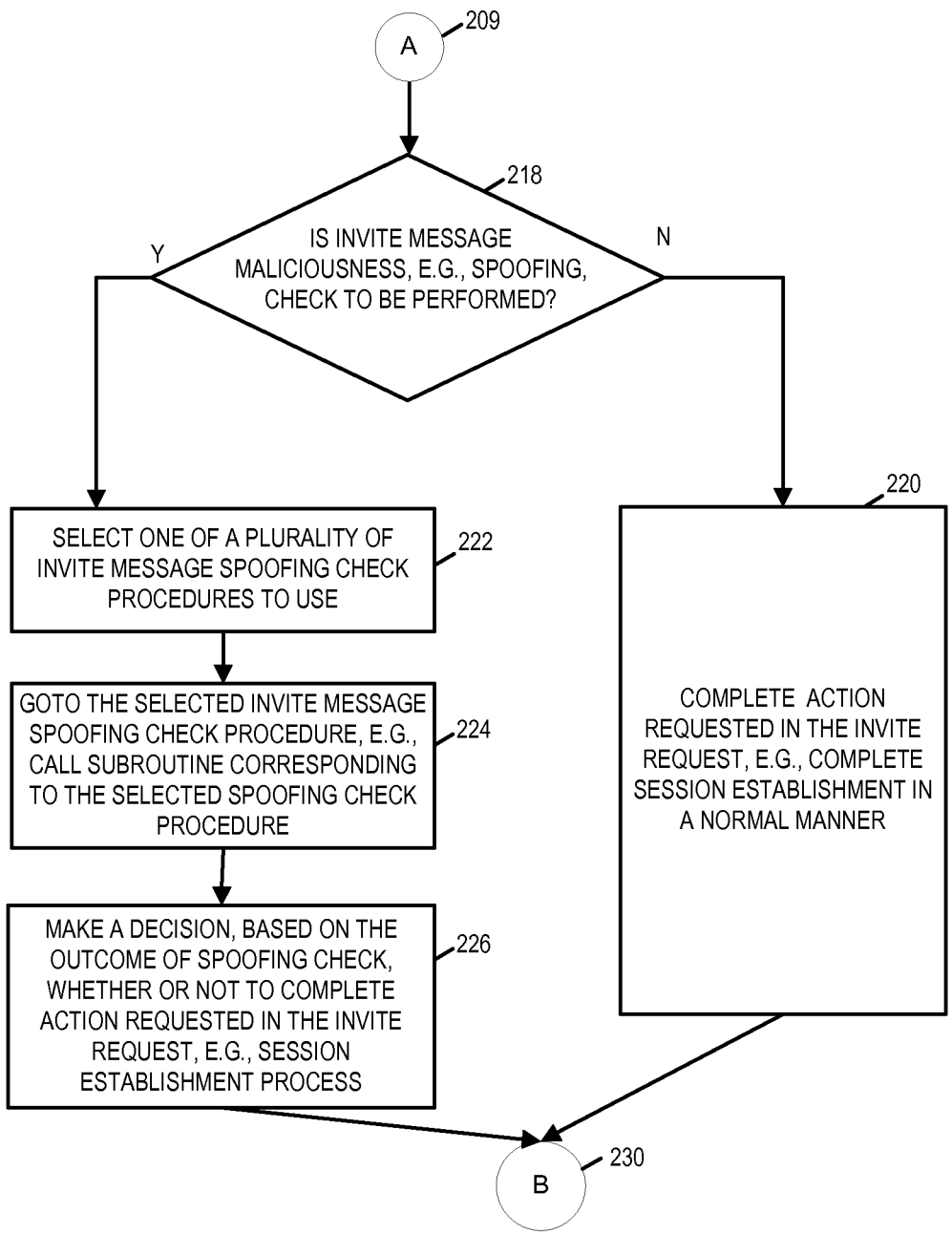

FIG. 2, which comprises the combination of FIGS. 2A and 2B, is a flowchart 200 of an exemplary method of operating a Session Border Controller (SBC) in accordance with one embodiment of the present invention. The method of flowchart 200 includes steps performed by elements of an exemplary session border controller SBC 106 shown in the exemplary system 100 of FIG. 1.

The exemplary method starts in step 202, e.g., with the session border controller being initialized. The operation proceeds from step 202 to step 204 where the SBC starts monitoring for messages, e.g., registration messages, invite messages and/or other messages from user devices in the system. Step 204 may be, and in some embodiments is, performed on an ongoing basis. Operation proceeds from step 204 to one of steps 206 and 208 which are performed asynchronously in some embodiments depending on which type of message is detected by the monitoring being performed. Depending on the type of message detected while monitoring, e.g., registration or Invite, the operation proceeds along one of the two parallel paths shown in the figure.

If monitoring detects a registration message the operation proceeds from step 204 to step 206 where a registration message is received by the SBC from an entity seeking to perform a SIP registration, said first registration message including a second sender address. Operation proceeds from step 206 to step 210. In step 210 the SBC determines if registration message spoofing check is to be performed. In some embodiments the spoofing check is performed if the SBC suspects that the incoming message is malicious or malformed. In various embodiments the SBC implements step 210 by calling/invoking a SUBROUTINE for determining if registration message spoofing check is to be performed which is discussed in detail in FIG. 3. If it is determined in step 210 that spoofing check is not to be performed the operation proceeds from step 210 to step 212 where the SBC allows the registration process to complete, e.g., by sending the received registration request message to the SIP registrar. Operation proceeds from step 212 back to monitoring step 204.

Figure 4:
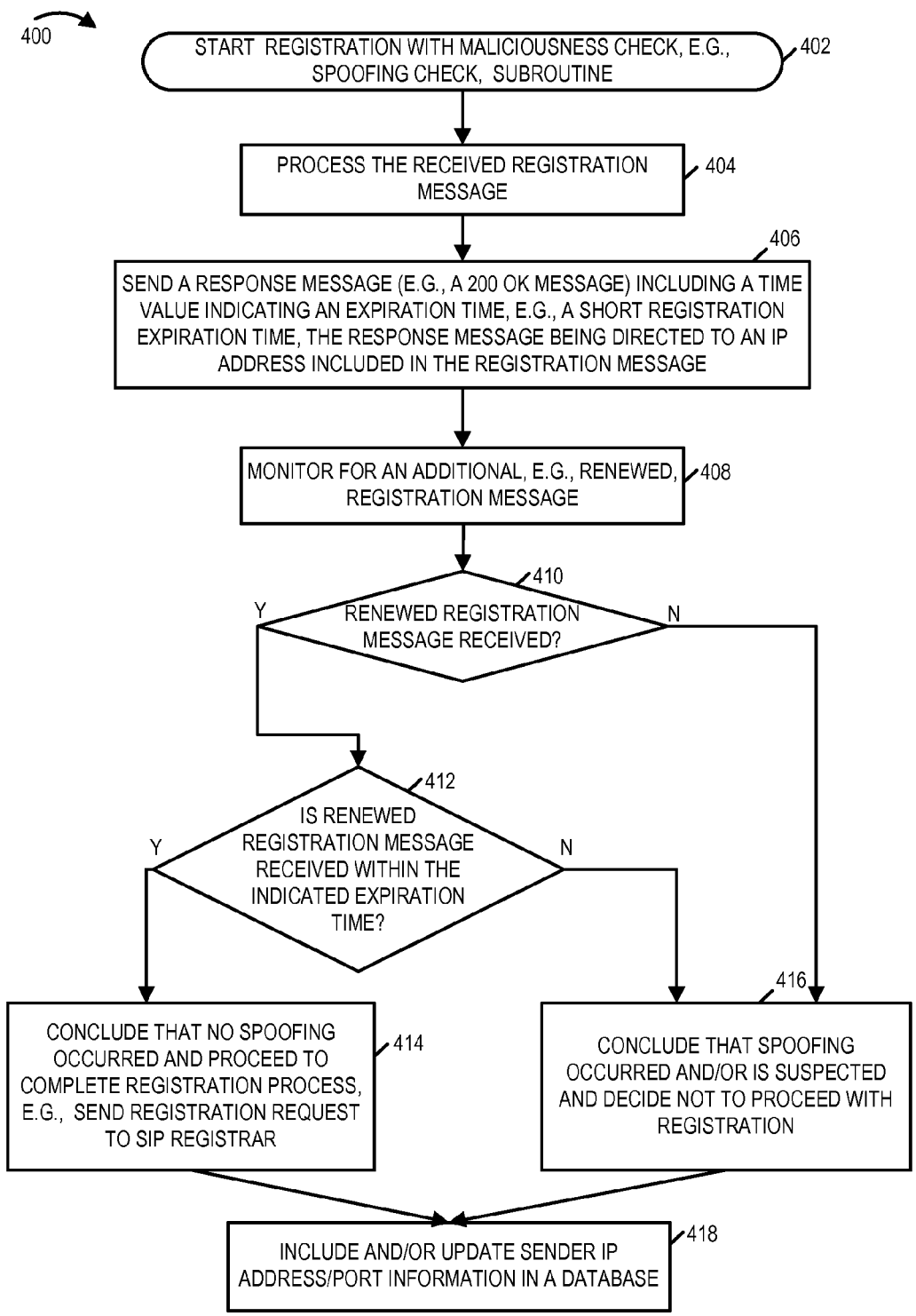
FIG. 4 is a flowchart illustrating the steps of a registration with maliciousness, e.g., spoofing, check subroutine implemented in accordance with some exemplary embodiments.

If in step 210 it is determined that spoofing check is to be performed the operation proceeds from step 210 to step 214. In step 214 the SBC does not allow the registration process to proceed, e.g., by not allowing the registration message to reach SIP registrar. Operation proceeds from step 214 to step 216. In step 216 a call to the REGISTRATION WITH SPOOFING CHECK SUBROUTINE is made. An exemplary REGISTRATION WITH SPOOFING CHECK SUBROUTINE is illustrated in FIG. 4 and discussed in detail later.

Returning to step 208. In step 208 an invite message is received and processed. Operation proceeds from step 208 to step 218 via connecting node A 209. In step 218 the SBC determines if an invite message spoofing check is to be performed. In some embodiments the invite message spoofing check is not necessarily performed for every incoming invite message but rather is performed if the SBC suspects that a received invite message is malicious or malformed. In various embodiments the SBC implements step 218 by calling an INVITE MESSAGE MALICIOUSNESS CHECK SUBROUTINE which is discussed in detail in FIG. 6. If it is determined in step 218 that maliciousness, e.g., spoofing, check is not to be performed the operation proceeds from step 218 to step 220. In step 220 the SBC allows the call establishment process to proceed in a normal manner, e.g., by sending the received invite message to the SIP registrar/application server 108. Operation proceeds from step 218 back to monitoring step 204 via connecting node B 230.

If in step 218 it is determined in step 218 that spoofing check is to be performed the operation proceeds from step 218 to step 222. In step 222 the SBC selects one of a plurality of invite message spoofing check procedures. In some embodiments the selection of a spoofing check procedure is based on a predetermined criteria. In some embodiments a spoofing check procedure is random selected from the plurality of available spoofing check procedures. In most embodiments normally one of the plurality of invite message spoofing check procedures is selected for performing a spoofing check however still in some embodiments the SBC may select more than one invite message spoofing check procedure to perform spoofing check by implementing a combination of the two spoofing checks.

Figure 8:
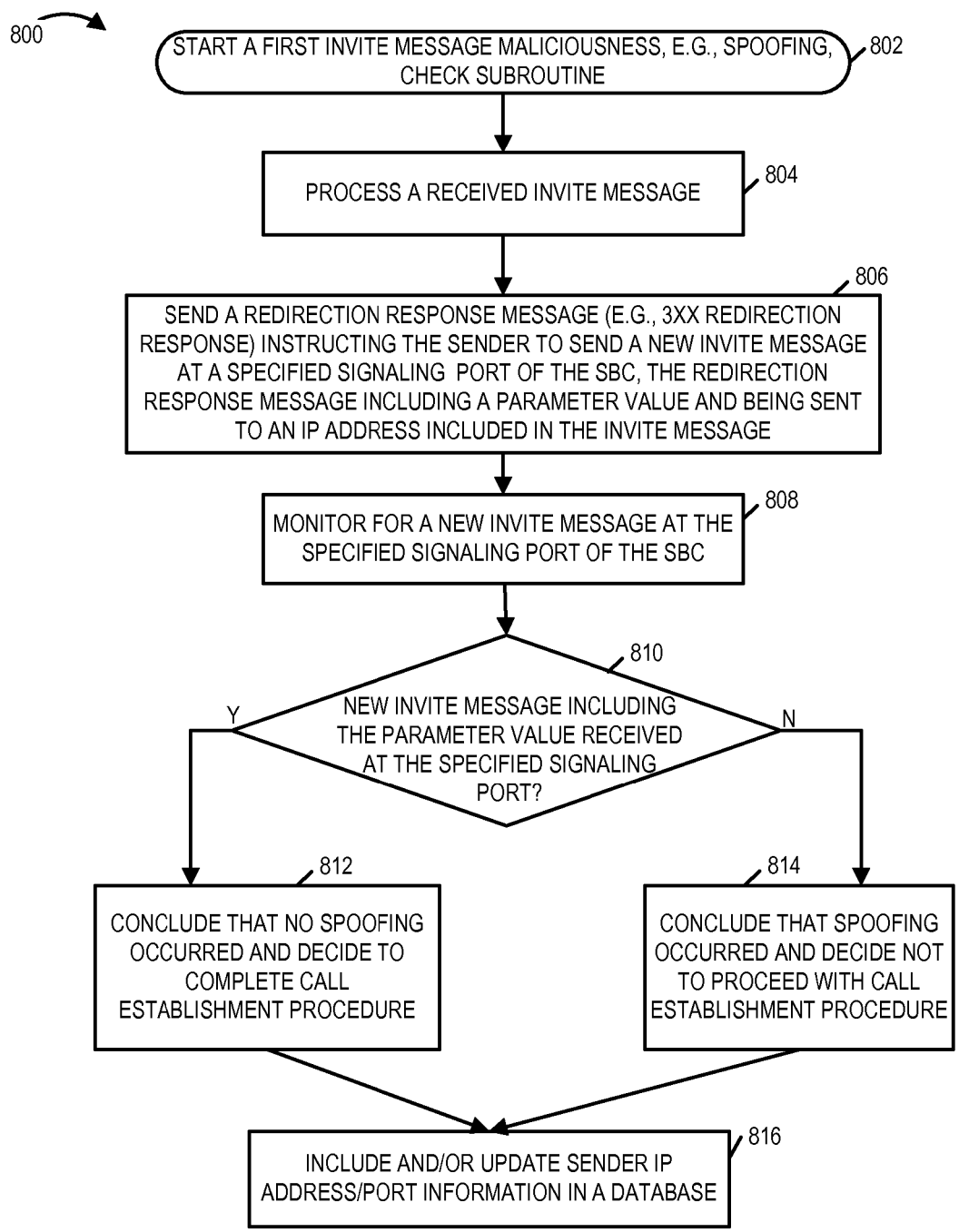
FIG. 8 is a flowchart illustrating the steps of an exemplary first subroutine for performing INVITE message maliciousness check, e.g., for a received INVITE message, in accordance with some embodiments.
Figure 11:
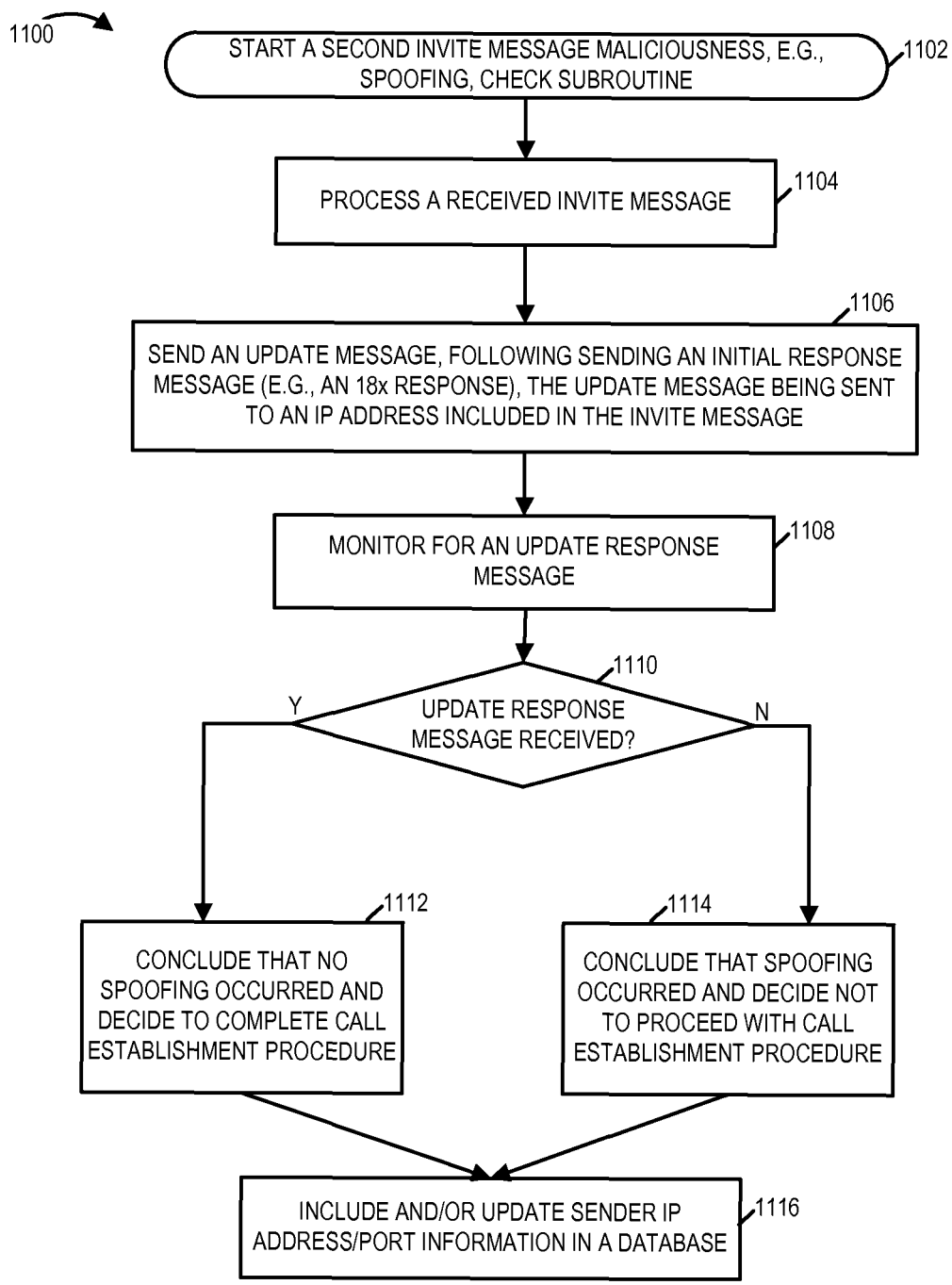
FIG. 11 is a flowchart illustrating the steps of an exemplary second subroutine for performing INVITE message maliciousness check, e.g., for a received INVITE message, in accordance with another exemplary embodiment.
Figure 14:
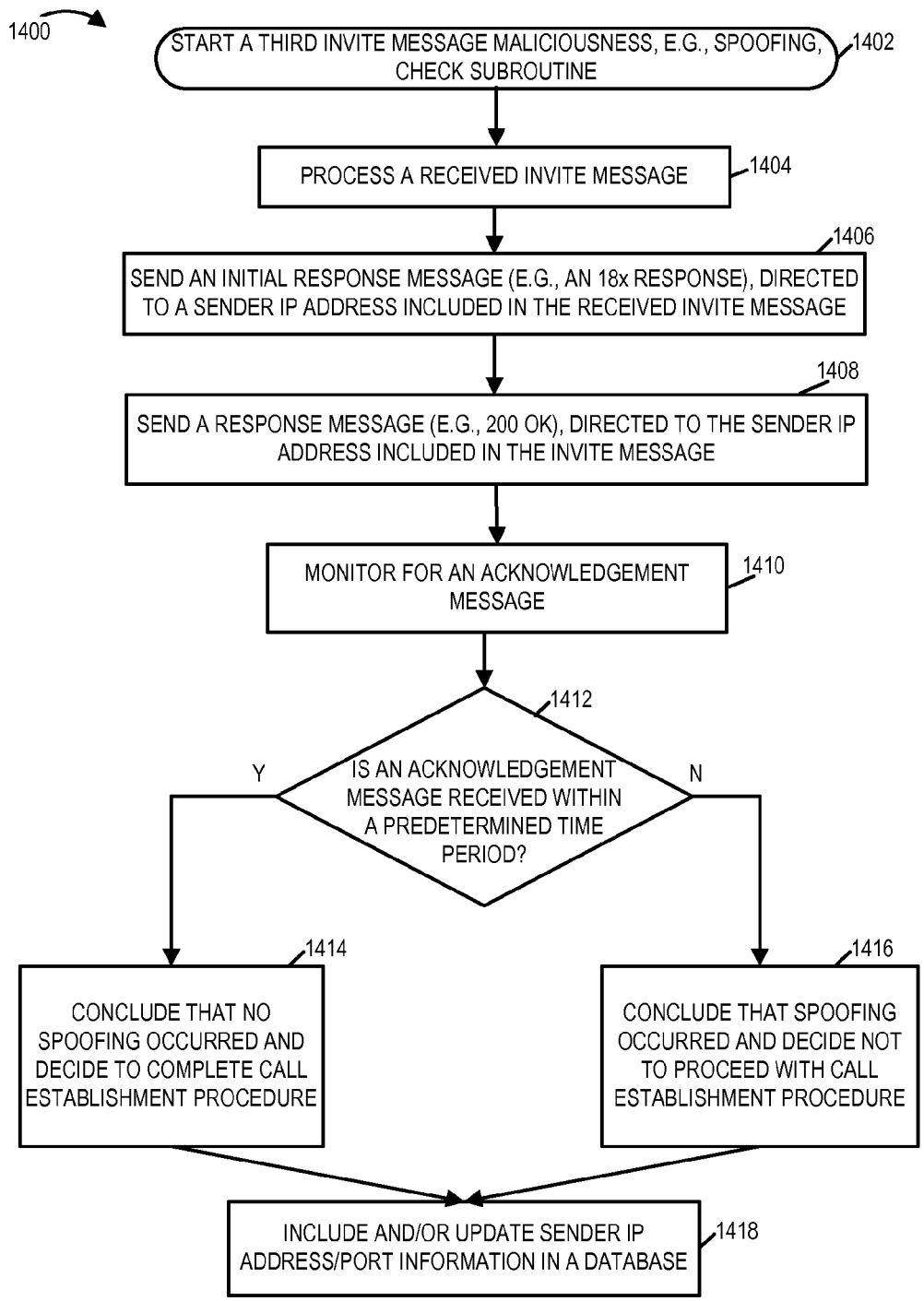
FIG. 14 is a flowchart illustrating the steps of an exemplary third subroutine for performing INVITE message maliciousness check, e.g., for a received INVITE message, in accordance with yet another exemplary embodiment.

Operation proceeds from step 222 to step 224. In step 224 the SBC calls the selected one of the invite message spoofing check subroutines to implement the spoofing check. Three different exemplary invite message spoofing check subroutines each implementing a different spoofing check procedure, are shown in FIGS. 8, 11 and 14 and are discussed in detail later.

Operation proceeds from step 224 to step 226. In step 226 the SBC makes a decision, based on the outcome of the selected spoofing check procedure, whether or not to proceed with call establishment process. Operation proceeds from step 226 back to monitoring step 204 via connecting node B 230.

Figure 3:
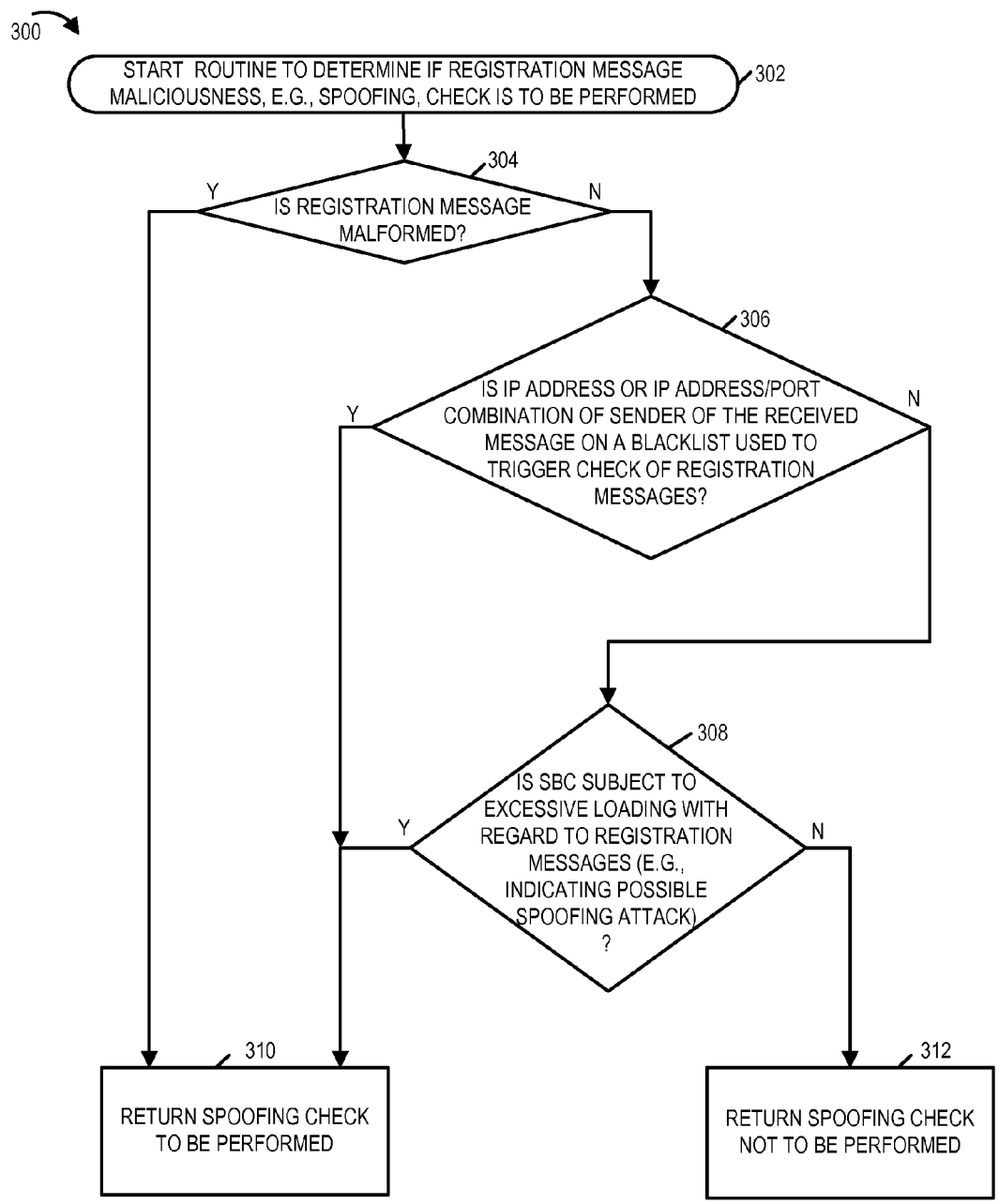
FIG. 3 is a flowchart illustrating the steps of a subroutine for implementing a method for determining if registration message maliciousness check, e.g., spoofing check, is to be performed, e.g., for a received registration message.

FIG. 3 illustrates a subroutine 300 for implementing a method to determine if registration message spoofing check is to be performed, e.g., for a received registration message. In various embodiments the subroutine 300 is executed and implemented by the SBC 106, upon receiving a registration message from a device. In various embodiments the subroutine 300 is executed when the SBC performs step 210 of method flowchart 200 thereby calling/invoking subroutine 300. Thus the operation starts in step 302 when the call to the subroutine 300 is made.

Operation proceeds from start step 302 to step 304. In step 304 it is determined if the received registration message is malformed and/or appears suspicious. In accordance with the features of various embodiments of the invention this can be done in a variety of ways, for example, the SBC 108 may analyze the received message to check if the message format is appropriate, if the message is missing fields etc.

Based on the determination in step 304 the operation proceeds to one of the steps 306 or 310. If in step 304 it is determined that the received registration message is not malformed the operation proceeds from step 304 to step 306 otherwise the operation proceeds to step 310. In step 306 the SBC checks if the IP address corresponding to the sender, included in the received registration message, is on a blacklist used to trigger check of registration messages. In accordance with one aspect of the invention the SBC maintains a list of IP addresses and/or IP address/port combinations which have been used in previously received malicious/suspicious messages. In some embodiments the SBC uses this list to compare and check sender IP addresses included in the received messages. If there is a match there is a greater possibility that a received message is malicious/spoofed and thus a spoofing check should be performed.

If in step 306 it is determined that there is a successful match for the IP address or IP address/port combination of sender of the received registration message, the operation proceeds from step 306 to step 310 otherwise the operation proceeds to step 308. Thus either when it is determined in step 304 that the received registration message is malformed or when it is determined in step 306 that the sender's IP address or IP address/port combination from the received registration message matches with a corresponding entry on the blacklist, the operation proceeds to step 310. In step 310 one possible result of the determination subroutine 300 indicating that spoofing check is to be performed is returned as output.

If in step 306 it is determined that the sender's IP address or IP address/port combination does not match with an IP address or IP address/port combination entry on the blacklist, the operation proceeds from step 306 to step 308. In step 308 it is determined if the SBC is subject to excessive loading with regard to registration messages which may indicate a possible spoofing attack. For example in some embodiments if the number of registration messages being handled by the SBC in a given time interval exceeds a threshold number of registration messages then it is determined that the SBC is subject to excessive loading. The threshold number may be, e.g., a predetermined number or a number calculated based on average number of registration messages that the SBC normally handles at a given time under normal conditions.

If in step 308 it is determined that the SBC is subject to excessive loading with regard to registration messages the operation proceeds from step 308 to step 310 where the decision indicating that spoofing check is to be performed is returned as output of the subroutine 300. If it is determined that SBC is not under excessive loading with regard to registration messages the operation proceeds from step 308 to step 312. In step 312 an output of the determination subroutine 300 indicating that spoofing check is not to be performed for the received registration message is returned as output of the subroutine 300.

FIG. 4 illustrates a registration with spoofing check subroutine 400, e.g., performed for a received registration message, in accordance with some embodiments. In various embodiments the subroutine 400 is executed and implemented by the SBC 106, upon determining that spoofing check is to be performed for a received registration message. In some embodiments, the registration process may or may not be completed depending on the outcome of the spoofing check being performed as will be discussed. Consider that the SBC 106 receives a first registration message from a registering entity seeking to perform a session initiation protocol registration, the first registration message including a second sender address. Further consider that the SBC decides that registration message spoofing check is to be performed.

Operation starts in step 402 where the call to the subroutine is made. Operation proceeds from start step 402 to step 404. In step 404 the received registration message is processed, e.g., to recover the message and analyze one or more message fields. Operation proceeds from step 404 to step 406. In step 406 the SBC sends a response message, e.g., a 200 OK message, including a time value indicating a registration lifetime, directed to the sender IP address included in the received registration message. In various embodiments the time value indicates a remaining time for which the registration will remain valid. For example the response message may indicate that the registration of the user device will expire, e.g., in a time≤4 seconds. In some embodiments the registration lifetime is less than 20 seconds. In some other embodiments the registration lifetime less than 10 seconds, or less than 5 seconds, e.g., 4 or fewer seconds.

The response message is sent to the sender's IP address included in the registration message with an understanding that if the recipient of the response message did not send the original registration request, the recipient will not respond to the response message with a renewed registration request prior to the expiration time indicated in the response message and thus it can be concluded that the original registration request was not sent by the user device corresponding to the IP address included in the registration message thereby indicating that spoofing occurred. Also if the IP address included in the original registration request is fake, there may be no device at the IP address to which the response message is directed and thus again no renewed registration request will be received by the SBC and it can be concluded that spoofing occurred.

Operation proceeds from step 406 to step 408. In step 408, following communication of the response message, the SBC monitors for an additional registration request message, e.g., a renewed registration request from the recipient of the response message. In various embodiments the monitoring for the renewed registration request is performed for a limited time, e.g., for an amount of time greater than or equal to the registration expiration time indicated in the response message. Operation proceeds from step 408 to step 410.

In step 410 the SBC determines whether or not a renewed registration request is received. If it is determined that a renewed registration request is received the operation proceeds from step 410 to step 412 otherwise the operation proceeds to step 416. In step 412, following receipt of the renewed registration request, it is determined if the renewed registration request was received prior to the expiration of the indicated registration expiration time. Thus together in steps 410 and 412 the SBC makes a decision as to whether or not the registration message corresponds to a spoofing operation based on whether the monitoring (step 408) detects a new, e.g., second, registration message prior to expiration of the registration lifetime. If it is determined that the renewed registration request was received prior to the expiration of the indicated registration lifetime the operation proceeds from step 412 to step 414.

In step 414 the SBC concludes that no spoofing has occurred and facilitates completion of the registration process, e.g., sends the registration request to the SIP registrar. Operation proceeds from step 414 to step 418.

If in step 410 it is determined that a renewed registration request is not received the operation proceeds from step 410 to step 416. In step 416 the SBC concludes that spoofing has occurred and/or suspected and thus decides that registration process should not proceed further. In various embodiments when it is concluded that spoofing has occurred the SBC decides to cancel/discontinue the registration process. Operation proceeds from step 416 to step 418.

Returning to step 418. In step 418 the SBC includes and/or updates sender IP address and/or IP address/port combination information in a database along with other relevant information corresponding to the sender IP address and/or IP address/port combination. In some embodiments the exemplary database includes information corresponding to various sender IP addresses and/or IP address/port combinations which have been included in a registration message processed by the SBC. In some embodiments the database is updated after processing a new registration message to include information corresponding to sender IP addresses/or IP address/port combinations regardless of whether spoofing has occurred or not. As part of the update additional information, corresponding to each of the IP addresses and/or IP address/port combinations in the database, is added by the SBC 106 in the database indicating whether an IP address and/or IP address/port combination has failed spoofing check and/or is suspected to be fake/malicious. Thus the database includes information corresponding to each of the listed IP addresses and/or IP address/port combinations indicating whether an address and/or IP address/port combination is considered suspected or malicious, e.g., based on the spoofing check determinations performed by the SBC. A failed spoofing check can, and in some embodiments is, followed by a check involving the sending of a message to the indicated source of the message believed to be malicious, e.g., spoofed and checking to see if an expected response message is received. The message may be a SIP invite or another SIP message to which a response or reply is expected to be received. Result of this additional check and, and in some embodiments is, included in the database.

The database and the checking of the database is described in terms of the senders source IP address and/or port. While this may be one "key", it is not likely to be the primary key in many real implementation and the database may include additional information corresponding to a message which is determined to be malicious or otherwise detected as being malicious. As should be appreciated, if the addressing is being spoofed, the IP addresses are likely to correspond to legitimate addresses and may not be particularly useful in distinguishing the attacker unless the same IP address is used multiple times. Furthermore, a spoofing peer will typically just use a range of source IP addresses making this table check less effective than may be desirable.

In some embodiments, the database that is generated includes information on "distinguishing marks" associated with packet and messages determined or believed to be malicious, e.g., corresponding to a spoofing or other attack. Such distinguish marks include things like on which physical interface or VLAN on malicious message or packet came in on, what headers are in the packet, what words are in the packet, etc. In some embodiments such information is stored in the database on a per message basis. The features of malicious messages for which information is included in the database is automatically analyzed, e.g., by a computer system, server or other device including a processor and memory, which is configured to analyzed and compare features of malicious messages to identify common features of the detected malicious messages/packet or packets which are identified as possibly corresponding to a malicious operation. The identified independent but common features of the malicious messages and/or message which may correspond to a malicious operation, e.g., common words and physical interface information which are separate independent pieces of information, can, and in some embodiments are, used independent keys which are compared to an incoming message or packet to accesses the likelihood that it is malicious. In some embodiments, the device performing the maliciousness test determines the likelihood of maliciousness on how many bad characteristics are matched, i.e., how many features of the incoming message or packet match the known common features of detected known malicious packets.

Such signature based keying/matching can provide good results under a wide range of attack conditions since many attack tools builds attack messages from a common template and just substitute different phone numbers, user names, and IP addresses in specific packet instances.

Thus, in at least some embodiments the database has many entries built from many keys, e.g., source IP address, source port, physical interface information, words in the message or packet, etc. Thus, for each packet determined to be a spoofed packet multiple pieces of information of the type just described are included in the database with each piece of information being capable of being capable of being used as a distinguishing mark of malicious packet. While it may be unclear at first which distinguishing marks in the set of marks is important, as multiple malicious messages and/or packets are detected and the database grows, the commonality between the malicious packet entries facilitates identification of the which entires, i.e., pieces of information, can be used to identify a malicious packet or message with multiple pieces of information being used in combination in many embodiments to automatically detect malicious packets after the common features of malicious packet are identified, e.g., during a spoofing, flooding or other attack.

In accordance with one aspect of the invention the SBC creates and maintains a database of the type described above to facilitate easy identification of suspicious IP addresses corresponding to user devices from which spoofing attacks have been detected. Such a database provides valuable information to operators/service provider systems to identify malicious sources of spoofing attacks and take a variety of decisions regarding how to manage and/or block such IP addresses and/or IP address/port combinations from obtaining service. The SBC can then automatically detect common features of malicious messages/packets and identify incoming messages and/or malicious packets based on such characteristics.

Figure 5:
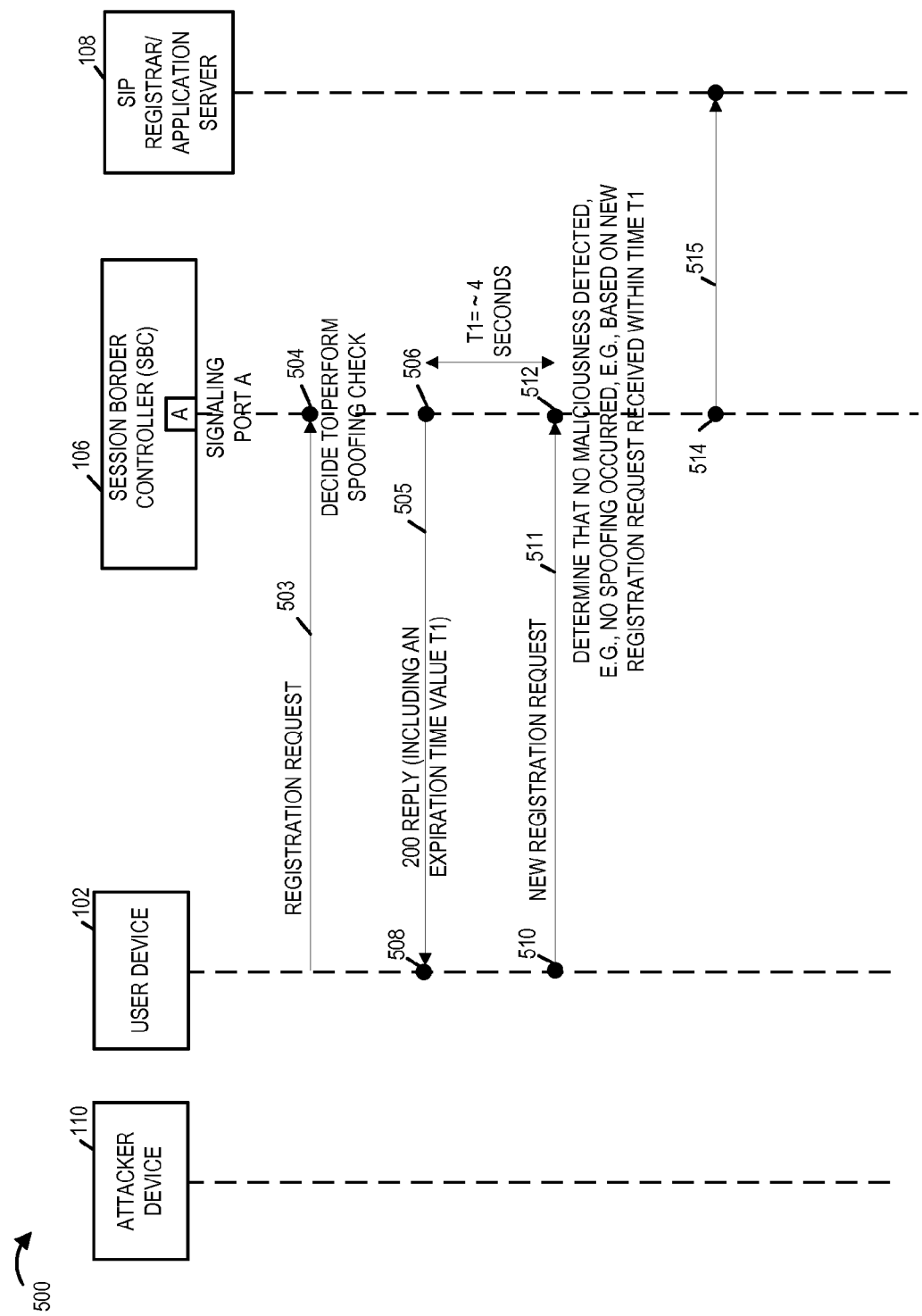
FIG. 5 illustrates the steps and associated signaling exchange between various devices/servers performed in an exemplary registration message maliciousness check process in accordance with some exemplary embodiments.

FIG. 5 is a drawing 500 illustrating the steps and associated signaling exchange between various devices/servers performed in an exemplary registration message spoofing check process such as the one illustrated in flowchart 400 implemented using the system shown in FIG. 1. FIG. 5 embodiment illustrates a case where no spoofing takes place as the registration request is sent by a genuine user device as opposed to an attacker device. Messages, information, content and/or signals communicated between devices are represented in FIG. 5 using arrows. At the top of FIG. 5, various elements of the system 100 which may participate in the exemplary registration message spoofing check process in accordance with one embodiment of the invention, are shown. The illustrated components 500 include the user device 102, the attacker device 110, the SBC 106, and the SIP registrar/application server 108.

The process starts in step 504 where the SBC 106 receives a registration request message 503 from the user device 102. From the perspective of the SBC 106, it is not known whether the registration request is from a real device with genuine registration intentions or it is part of an attempted spoofing attack from a malicious attacker device such as device 110. The SBC receives and processes the registration message in step 504. As part of the processing, in some embodiments the SBC 106 analyses the received message to check if the message is malformed and/or appears suspicious. Furthermore in step 504 the SBC 106 makes a decision whether or not a spoofing check should be performed. In some embodiments the decision is made based on whether the received registration request message is determined to be malformed and/or appeared to be suspicious. The SBC 106 in some embodiments compares the IP address or IP address/port combination in the received registration message to a blacklist including IP addresses and IP address/port combinations which have been used in previously received suspicious/malicious messages. In some embodiments if there is a match, the SBC 106 concludes that there is a possibility of spoofing attack and thus spoofing check should be performed. In still some embodiments the SBC 106 decides to perform a spoofing check for every new registration message regardless of other factors discussed above. The processing performed in step 504 is similar to the processing discussed in steps 304, 306 and 308 of flowchart 300.

Following making the decision that spoofing check is to be performed, in step 506 the SBC sends a reply message 505, e.g., 200 OK message, directed to the IP address included in the received registration request, in response to the received registration request as discussed in detail in step 406 of flowchart 400. The response message 505 includes a registration expiration time value, e.g., ~4 seconds, indicating a time in which registration will expire. It should be appreciated that the reply message is directed to the IP address included in the registration request message field carrying address corresponding to the sender regardless of whether or not the registration message had been actually sent by a corresponding device whose IP address is included in the registration message or by an attacker device.

Next in step 508 the user device 102 receives and processes the reply 505 from the SBC 106. As part of the processing in step 508 the user device 102 analyses the registration expiration time value T1 and concludes that the initial registration will expire in the indicated time and decides that a refresh/renewed registration request is needed to be sent prior to the expiration of the indicated expiration time in order to be registered. Accordingly, in step 510 the user device 102 sends a refresh/renewed registration request 511 within the indicated expiration time, e.g., in this example in less than 4 seconds. It should be appreciated that since in FIG. 5 example no spoofing is taking place the reply message is received at the user device 102 which is the same device that sent the original registration request 503. However this is not true in cases where spoofing is taking place since in such cases the attacker device that sent the registration request will not receive the reply 505 sent by the SBC 106. The attacker normally uses IP addresses corresponding to another device and thus will not receive the reply sent by the SBC 106 to the device whose address has been used by attacker in the registration message address field. Such a spoofing case is illustrated in FIG. 6 and discussed later.

In step 512 the SBC 106 receives the renewed registration request message 511 and processes the received registration request message 511. The SBC determines that the renewed registration request 511 came from the same user device as the initial registration request 503, e.g., same IP address used by sender in both registration requests, and that the renewed registration request is received around the time consistent with the provided expiration value. Based on the determination the SBC 106 can conclude that no spoofing has taken place and thus in accordance with the features of the invention the registration process should be allowed to proceed. Accordingly in step 514 the SBC 106 sends a signal 515 communicating the registration request from the user device 102 to the SIP registrar 108. In some embodiments the registration proceeds as normal from this point onwards.

Figure 6:
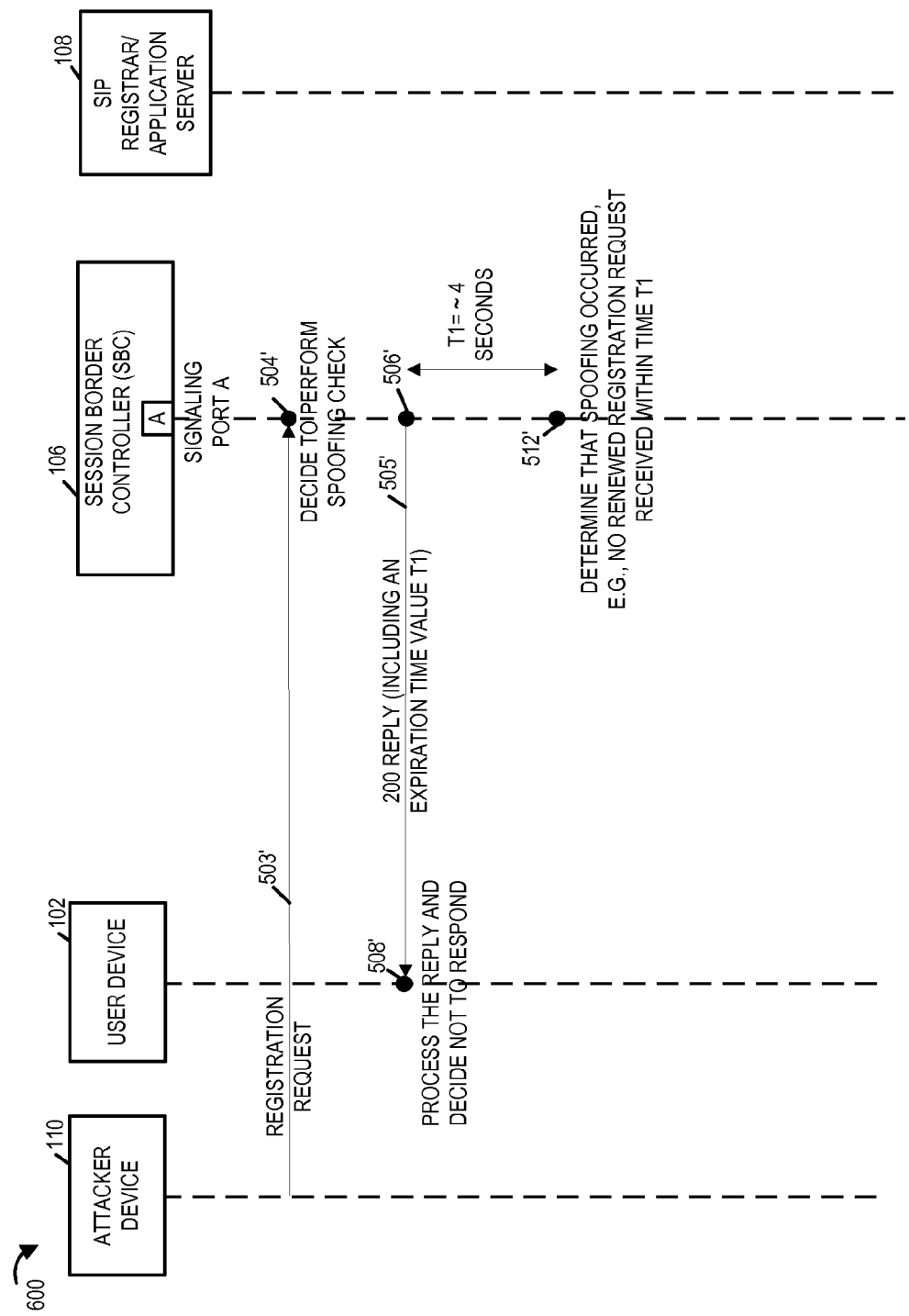
FIG. 6 illustrates the steps and associated signaling exchange between various devices/servers in a registration message check process in a case where spoofing or another malicious activity is taking place.

FIG. 6 is a drawing 600 illustrating the steps and associated signaling exchange between various devices/servers in a registration message spoofing check process in a case where spoofing is taking place. Even though the registration message spoofing check process is the same as the one shown in FIG. 5, FIG. 6 embodiment illustrates a case where spoofing occurs as the registration request is sent by an attacker device resulting in some different signaling and process outcomes. For the purposes of discussion consider that the attacker device obtains and uses the IP address corresponding to the user device 102 for sending spoofing messages. The elements of the system 100 which may participate in the illustrated process have been shown on the top. The illustrated components include the user device 102, the attacker device 110, the SBC 106, and the SIP registrar/application server 108. The steps and signaling in FIG. 6 example which are the same or similar to the steps and signaling of FIG. 5 have been labeled with the same reference numbers but ending with a prime ('). For example step 504' in FIG. 6 involves same or similar processing as discussed with regard to step 504.

The process starts in step 504' where the SBC 106 receives a registration request message 503' from the attacker device 110. Again, from the perspective of the SBC 106, it is not known whether the registration request is from a device with genuine registration intentions or it is part of an attempted spoofing attack from the attacker device 110. The SBC 106 receives and processes the registration message 503' in step 504'. The processing is same or similar to that discussed in step 504 of FIG. 5 in detail and thus will not be discussed again. As part of the processing, the SBC 106 makes a decision that a spoofing check should be performed.

Following making the decision that spoofing check is to be performed, in step 506' the SBC sends a reply message 505', e.g., 200 OK message, directed to the IP address included in the received registration request, in response to the received registration request as discussed in step 506 of FIG. 5. However it should be noted that since in FIG. 6 example the attacker device 110 used the IP address corresponding to user device 102 as the sender address in the registration message 503', therefore as illustrated in FIG. 6 the reply message 505' is directed to the user device 102 and not attacker device 110. Thus the attacker device 110 does not receive the reply 505' and does not even know that a reply 505' indicating a registration expiration time has been sent to the user device 102 whose IP address was used by the attacker for spoofing. The reply message 505' includes the same or similar parameters, e.g., a short registration expiration time value, such as those discussed with regard to reply message 505.

Next in step 508' the user device 102 receives and processes the reply 505' from the SBC 106. As part of the processing the user device 102 analyses the reply message contents and concludes that it did not request a registration and thus the reply message (200 OK) indicating the registration expiration time does not belong to and/or applicable to the user device 102. Thus the user device 102 does not respond back to the SBC 106. As should be appreciated from FIG. 6, since no registration request is sent from user device 102 due to the above discussed reasons, no signaling exchange is shown with regard to step 512'.

Since the SBC that sent the reply 505' monitors for a renewed registration request from the user device 102, in step 512' following the expiration of the time period indicated in the reply 505' when the SBC 106 does not receive a refresh/renewed registration request, the SBC 106 concludes that spoofing has occurred. Based on the conclusion the SBC 106 decides that the registration process should be terminated and not be allowed to proceed. Accordingly the SBC drops the initial registration request received from the attacker device and does not allow the registration request to reach the SIP registrar 108. Furthermore in some embodiments in step 512' the SBC 106 updates sender IP address and/or IP address/port combination information in a database along with other relevant information corresponding to the sender IP address and/or IP address/port combination when it is determined that spoofing has occurred and the received registration request may correspond to a spoofing operation.

An exemplary method for determining whether or not a spoofing check on a received INVITE message should be performed will now be discussed. In general an INVITE is a SIP method that specifies the action that a requester (e.g., Calling Party) wants the server (e.g., Called Party) to take. The INVITE request includes a number of header fields. These header fields are named attributes that provide additional information about the INVITE message. The header fields in an INVITE message may include a unique identifier for a call, a destination address, Calling Party Address, and information about the type of session that the requester wishes to establish with the server.

Figure 7:
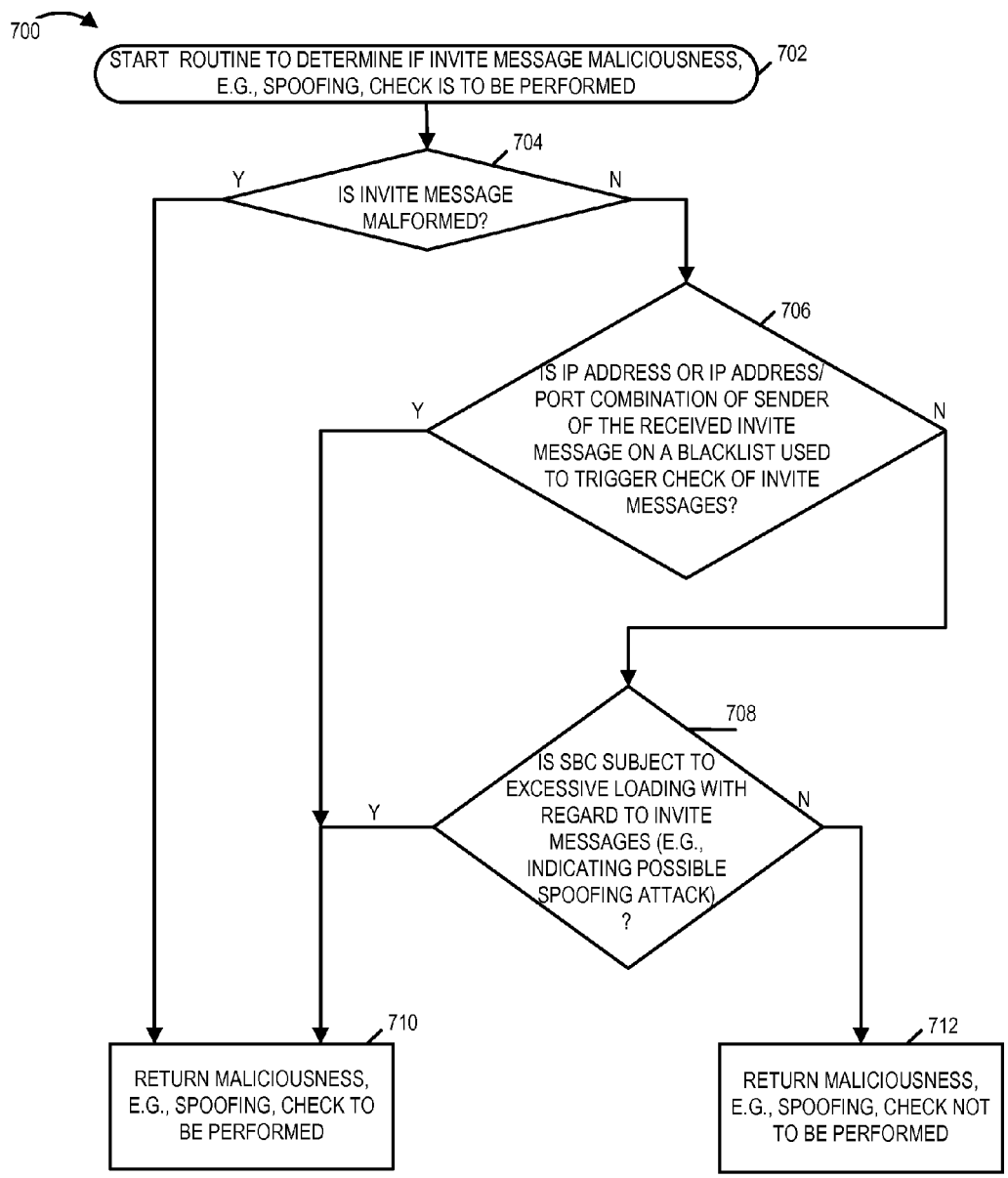
FIG. 7 is a flowchart illustrating the steps of an exemplary subroutine for implementing a method for determining if INVITE message maliciousness check is to be performed, in accordance with some exemplary embodiments.

FIG. 7 illustrates a subroutine 700 for implementing a method to determine if INVITE message spoofing check is to be performed, e.g., for a received SIP INVITE message. In various embodiments the subroutine 700 is executed and implemented by the SBC 106, upon receiving an INVITE message from a device. In various embodiments the subroutine 700 is executed when the SBC performs step 218 of method flowchart 200 thereby calling/invoking subroutine 700. Thus the operation starts in step 702 when the call to the subroutine 700 is made.

Operation proceeds from start step 702 to step 704. In step 704 it is determined if the received INVITE message is malformed and/or appears suspicious. As discussed earlier with regard to the registration message in step 304 of FIG. 3, checking whether a received message is malformed can be done in a variety of ways, for example, the SBC 106 may analyze the received message to check if the message format is appropriate, if the message is missing fields etc.

Based on the determination in step 704 the operation proceeds to one of the step 706 or 710. If in step 704 it is determined that the received INVITE message is not malformed the operation proceeds from step 704 to step 706 otherwise the operation proceeds to step 710. In step 706 the SBC checks if the IP address corresponding to the sender, included in the received INVITE message, is on a blacklist used to trigger checking of INVITE messages. In accordance with one aspect of the invention the SBC maintains a list of IP addresses and/or IP address/port combinations which have been used in previously received malicious/suspicious INVITE messages. In some embodiments the SBC uses this list to compare and check sender IP addresses included in received messages. If there is a match there is a greater possibility that a received message is malicious/spoofed and thus a spoofing check should be performed.

If in step 706 it is determined that there is a successful match for the IP address used in the received INVITE message or for the IP address/port combination used for the received INVITE message, the operation proceeds from step 706 to step 710 otherwise the operation proceeds to step 708. Thus either when it is determined in step 704 that the received INVITE message is malformed or when it is determined in step 706 that the sender's IP address or IP address/port combination from the received INVITE message matches with a corresponding entry on the blacklist, the operation proceeds to step 710. In step 710 one possible result of the determination subroutine 700 indicating that spoofing check is to be performed is returned as output.

If in step 706 it is determined that the sender's IP address or the corresponding IP address/port combination does not match with an IP address or IP address/port combination entry on the blacklist, the operation proceeds from step 706 to step 708. In step 708 it is determined if the SBC is subject to excessive loading with regard to INVITE messages which may indicate a possible spoofing attack. For example in some embodiments if the number of INVITE messages being handled by the SBC in a given time interval exceeds a threshold number of INVITE messages then it is determined that the SBC is subject to excessive loading. The threshold number may be, e.g., a predetermined number or a number calculated based on average number of INVITE messages that the SBC normally handles in a given time interval under normal conditions.

If in step 708 it is determined that the SBC is subject to excessive loading with regard to INVITE messages the operation proceeds from step 708 to step 710 where the decision indicating that spoofing check is to be performed is returned as output of the subroutine 700. If it is determined that SBC is not under excessive loading with regard to INVITE messages the operation proceeds from step 708 to step 712. In step 712 an output of the determination subroutine 700 indicating that spoofing check is not to be performed for the received INVITE message is returned as output of the subroutine 700.

Various exemplary methods for performing a spoofing check on an INVITE message in accordance with the invention will now be discussed.

FIG. 8 is a flowchart illustrating the steps of a first subroutine 800 for performing INVITE message spoofing check, e.g., for a received INVITE message, in accordance with some embodiments. In some embodiments the subroutine 800 is executed and implemented by the SBC 106, upon deciding that spoofing check is to be performed for a received INVITE message. In some embodiments the SBC 106 allows the action requested in a received INVITE message, e.g., call setup/establishment, to proceed depending on the outcome of the INVITE message spoofing check being performed as will be discussed.

Operation starts in step 802 where the call to the subroutine is made. Operation proceeds from start step 802 to step 804. In step 804 the received INVITE message is processed, e.g., to recover the message and analyze one or more message fields. Consider that the INVITE message is received at a first signaling port, e.g., Signaling Port A, of the SBC 106.

Operation proceeds from step 804 to step 806. In accordance with one feature of an embodiment of the invention, in step 806 the SBC 106 sends a response message, e.g., a 3xx redirection response, including a nonce (randomly generated value) and an address and signaling port number to which the communication is redirected, the redirection response being directed to the sender IP address included in the received INVITE message and instructing the receiving device at the other end to redirect a new INVITE request at the specified address and port number. In some embodiments the nonce parameter is included e.g., in the message header. The value of the parameter is random and a new value is selected for each redirection. In simple terms the redirection response message indicates that the recipient of the redirection response message should redirect a new INVITE message to the specified address and signaling port on the SBC and include the nonce parameter in the new redirected INVITE message.

The redirection response message is sent to the sender's IP address included in the INVITE message with an understanding that if spoofing has occurred and the recipient of the response message did not send the original INVITE message, the recipient will not respond to the redirection response with a new INVITE message including the random parameter redirected at the specified signaling port and thus it can be concluded that the INVITE was not sent by a user device corresponding to the IP address included in the INVITE message thereby indicating that spoofing has taken place. Also if the IP address included in the original registration request is fake, there may be no device at the IP address to which the redirection response is directed and thus no new INVITE will be received by the SBC 106 and it can be concluded that spoofing occurred.

Operation proceeds from step 806 to step 808. Following communication of the response message, in step 808 the SBC 106 starts monitoring for a new INVITE message from the sender at the specified signaling port of the SBC. In some embodiments the monitoring for the new INVITE is performed for a limited time, e.g., for a predetermined amount of time. Operation proceeds from step 808 to step 810. In step 810 the SBC determines whether or not an INVITE message including the random value parameter is received at the specified signaling port of the SBC. If it is determined that a new INVITE including the random value parameter is received at the specified signaling port the operation proceeds from step 810 to step 812 otherwise the operation proceeds to step 814. Thus in step 810 the SBC determines as to whether the invite message does not correspond to a spoofing operation or may correspond to a spoofing operation based on the detected response.

Following receipt of a new INVITE including the random value parameter at the specified signaling port, in step 812 the SBC concludes that no spoofing has occurred and facilitates call establishment process, e.g., communicate with the SIP registrar to facilitate call setup. Operation proceeds from step 812 to step 816.

If in step 810 it is determined that a new INVITE including the random value parameter is not received at the specified signaling port the operation proceeds from step 810 to step 814. In another scenario the SBC 106 may receive another INVITE including the same sender IP address as the first INVITE message but at the same signaling port at which the first INVITE was received. If after sending the redirection response a new INVITE is received at the old port at which the first INVITE was received, in some embodiments this indicates to the SBC that spoofing is taking place. In step 814 the SBC concludes that spoofing has occurred and/or suspected and thus decides that call establishment process should not proceed further. In various embodiments when it is concluded that spoofing has occurred the SBC decides to terminate the call establishment process. Operation proceeds from step 814 to step 816.

Returning to step 816. In step 816 the SBC includes and/or updates sender IP address and/or IP address/port combination information in a database along with other relevant information corresponding to the sender IP address and/or IP address/port combination. In some embodiments the exemplary database includes information corresponding to various sender IP addresses and/or IP address/port combinations which have been included in the INVITE messages processed by the SBC 106. In some embodiments the database is updated after processing a new INVITE message to include information corresponding to sender IP addresses/ or IP address/port combinations regardless of whether spoofing has occurred or not. As part of the update additional information, corresponding to each of the IP addresses and/or IP address/port combinations included the database, is added by the SBC 106 in the database indicating whether an IP address and/or IP address/port combination has failed a spoofing check and/or is suspected to be fake/malicious. Thus the database includes information corresponding to each of the listed IP addresses and/or IP address/port combinations indicating whether an address and/or IP address/ port combination is considered suspected or malicious, e.g., based on the spoofing check determinations performed by the SBC.

In accordance with one aspect of the invention the SBC creates and maintains such a database to facilitate easy identification of suspicious IP addresses corresponding to user devices from which spoofing attacks have been detected. Such a database provides valuable information to operators/service provider systems to identify malicious sources of spoofing attacks and take a variety of decisions regarding how to manage and/or block such IP addresses and/or IP address/port combinations from obtaining service.

Figure 9:
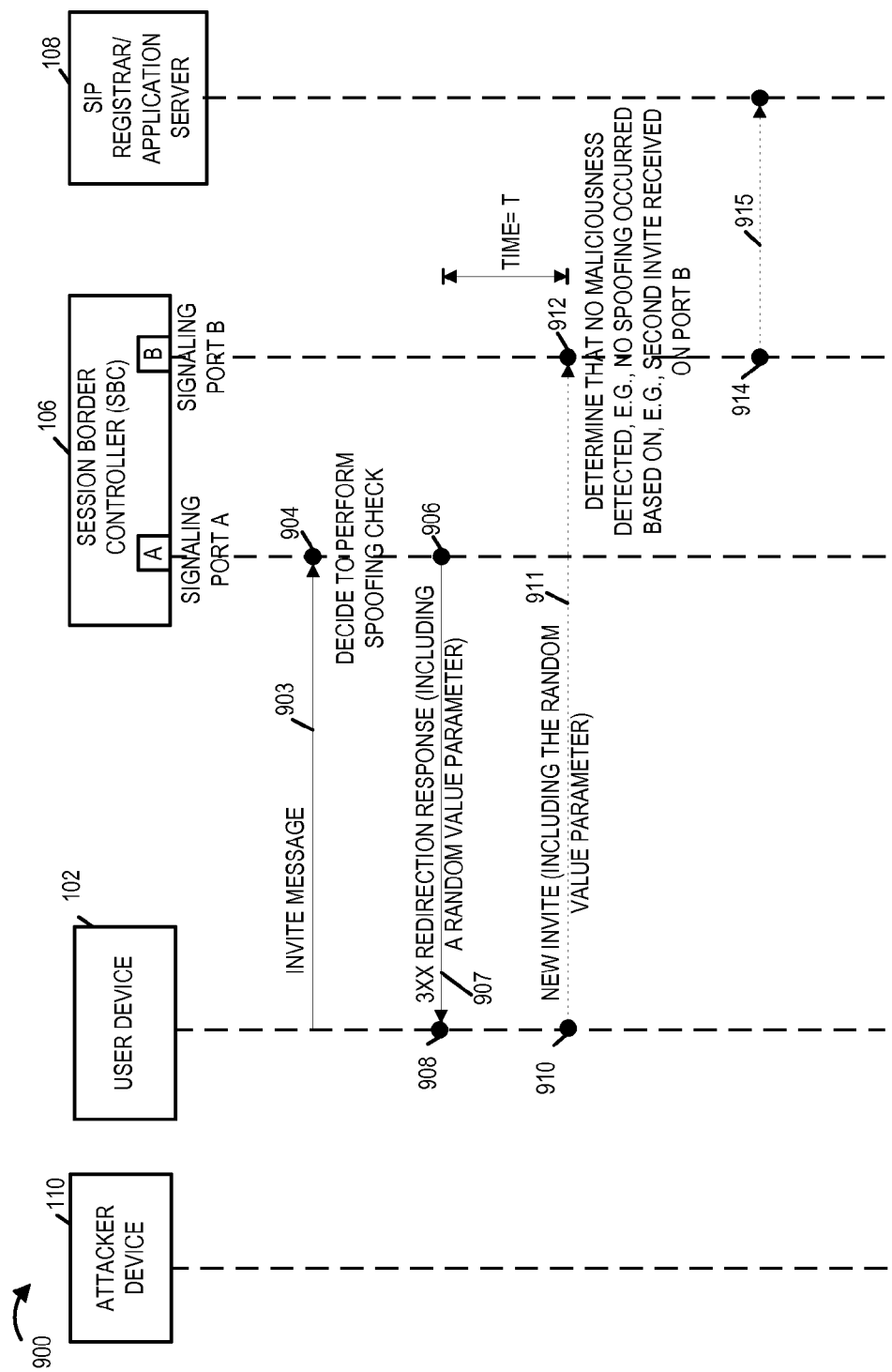
FIG. 9 illustrates the steps and associated signaling exchange between various devices/servers performed in a first exemplary INVITE message maliciousness check process in an exemplary case where spoofing does not occur.

FIG. 9 is a drawing 900 illustrating the steps and associated signaling exchange between various devices/servers performed in an exemplary INVITE message spoofing check process such as the one illustrated in flowchart 800 implemented using the system shown in FIG. 1. FIG. 9 illustrates a case where no spoofing takes place as the INVITE is sent by a genuine user device as opposed to an attacker device. Messages, information, content and/or signals communicated between devices are represented using arrows. At the top of FIG. 9, various elements of the system 100 which may participate in the exemplary INVITE message spoofing check process in accordance with one embodiment of the invention, are shown. The illustrated components include the attacker device 110, the user device 102, the SBC 106, and the SIP registrar/application server 108.

The process starts in step 904 where the SBC 106 receives an INVITE message 903 from the user device 102 on signaling port A of the SBC 106 as illustrated. From the perspective of the SBC 106, it is not known whether the INVITE message is sent by a genuine user or it is part of an attempted spoofing attack from a malicious attacker device such as device 110. The SBC receives and processes the INVITE message in step 904. As part of the processing, in some embodiments the SBC 106 analyses the received message to check if the message is malformed and/or appears suspicious. Furthermore in step 904 the SBC 106 makes a decision whether or not a spoofing check should be performed. In some embodiments the decision is made based on whether the received INVITE message is determined to be malformed and/or appeared to be suspicious. The SBC 106 in some embodiments compares the IP address or IP address/port combination in the received INVITE message to a blacklist including IP addresses and IP address/port combinations which have been used in previously received suspicious/malicious messages. In some embodiments if there is a match, the SBC 106 concludes that there is a possibility that a spoofing attack is being attempted and thus spoofing check should be performed. In still some embodiments the SBC 106 decides to perform a spoofing check for every new INVITE message regardless of other factors. The processing performed in step 904 is similar to the processing discussed with regard to steps 704, 706 and 708 of flowchart 700.

Following making the decision that spoofing check is to be performed, in step 906 the SBC sends a reply message 907, e.g., 3xx redirection response, directed to the IP address included in the received INVITE request which in this example corresponds to user device 102. The reply message 907 is in response to the received INVITE message as discussed in detail in step 806 of flowchart 800. The redirection response 907 includes a random value parameter and indicates an address and a second signaling port, e.g., signaling port B, at which the SBC would expect to receive an INVITE message. It should be appreciated that the redirection response is directed to the IP address included in the INVITE message field carrying address corresponding to the sender regardless of whether or not the INVITE message had been actually sent by a corresponding device whose IP address is included in the INVITE message or by an attacker device who may have stolen some other devices address.

Figure 10:
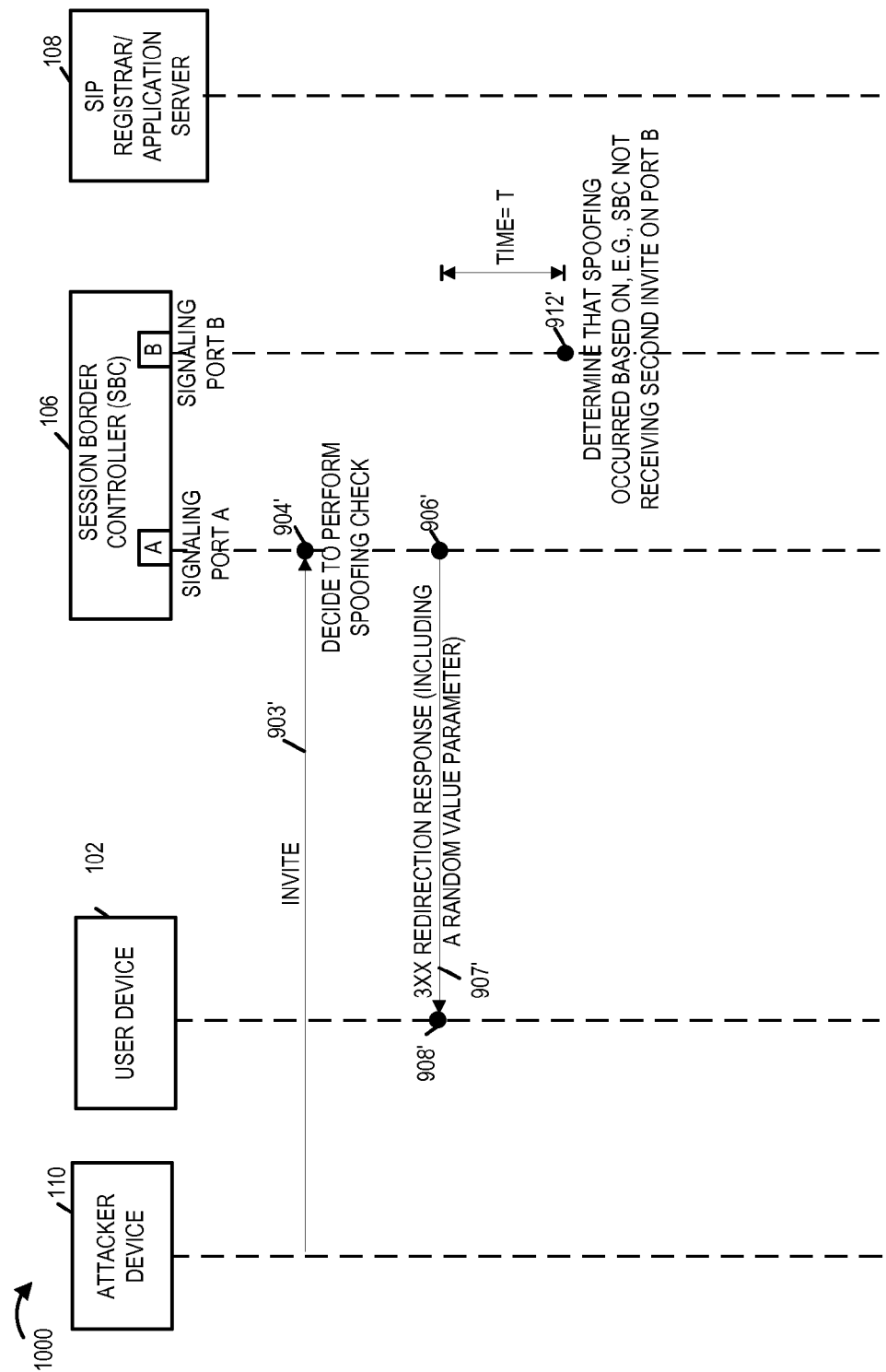
FIG. 10 illustrates the steps and associated signaling exchange between various devices/servers in the first exemplary INVITE message maliciousness check process in a case where spoofing or another malicious activity occurs.

Next in step 908 the user device 102 receives and processes the redirection response 907 from the SBC 106. It should be appreciated that since in the FIG. 9 example no spoofing is taking place, the redirection response 907 is received by the same device that sent the INVITE message 903. However this is not true in cases where spoofing is taking place since in such cases the attacker device that sends the INVITE will not receive the redirection response sent by the SBC 106. The attacker normally uses an IP address corresponding to another device in the INVITE message 903 and thus will not receive the redirection response sent by the SBC 106 to the device whose address has been used by attacker in the INVITE message address field. Such a spoofing case is illustrated in FIG. 10 and discussed later. As part of the processing in step 908 the user device 102 determines that a new INVITE message including the random value parameter is to be sent at the indicated signaling port, e.g., signaling port B of the SBC 106. Accordingly, in step 910 the user device 102 generates and sends a new INVITE message 911 directed to signaling port B of the SBC 106. In some embodiments the user device is aware of a time within which a new INVITE is to be sent in response to redirection messages and thus the new INVITE 911 is sent to the SBC 106 within the time period. In some embodiments this time period is preconfigured and known to operating devices.

In step 912 the SBC 106 receives the new INVITE message 911 including the random value parameter at signaling port B and processes the received message 911. The SBC determines that the new INVITE 911 is received on the indicated signaling port around the time consistent with the amount of time within which it should be received, e.g., preconfigured time period. Based on the determination in step 912 the SBC 106 concludes that no spoofing has taken place and thus in accordance with the features of the invention the requested action in INVITE message 903, e.g., call establishment, should be allowed to proceed. Accordingly in step 914 the SBC 106 sends a signal 915 to communicate with the SIP registrar 108 to facilitate call setup.

FIG. 10 is a drawing 1000 illustrating the steps and associated signaling exchange between various devices/servers in an exemplary INVITE message spoofing check process in a case where spoofing is taking place. In contrast to the FIG. 9 example, FIG. 10 embodiment illustrates signaling in a case where spoofing occurs as the INVITE message is sent by an attacker device resulting in some different signaling and process outcomes. For the purposes of discussion consider that the attacker device 110 somehow obtains and uses the IP address corresponding to the user device 102 for sending spoofing messages. The elements of system 100 which may participate in the illustrated process have been shown on the top and include the user device 102, the attacker device 110, the SBC 106, and the SIP registrar/application server 108. The steps and signaling in FIG. 10 example which are similar to the steps and signaling of FIG. 9 have been labeled with the same reference number but ending with a prime ('). For example step 904' in FIG. 10 involves same or similar processing as discussed with regard to step 904.

The process starts in step 904' where the SBC 106 receives an INVITE message 903' from the attacker device 110. Again, from the perspective of the SBC 106, it is not known whether the registration request is from a device with genuine intentions for, e.g., call setup or request another action, or it is part of an attempted spoofing attack from the attacker device 110. The SBC 106 receives and processes the INVITE message 903' in step 904'. The processing is the same or similar to that discussed in step 904 of FIG. 9 in detail and thus will not be discussed again. As part of the processing, the SBC 106 makes a decision that a spoofing check should be performed.

Following making the decision that spoofing check is to be performed, in step 906' the SBC sends a reply message 907', e.g., 3xx redirection response, directed to the IP address included in the received INVITE request, in response to the received INVITE message as discussed with regard to step 906 of FIG. 9. However it should be noted that since in FIG. 10 example the attacker device 110 used the IP address corresponding to user device 102 as the sender address in the INVITE message 903', therefore as illustrated in FIG. 10 the redirection response 907' is directed to the user device 102 and not attacker device 110. Thus the attacker device 110 does not receive the redirection response 907' including a random value parameter and indicating a second signaling port, e.g., signaling port B, at which the SBC would expect to receive a new INVITE message.

Next in step 908' the user device 102 receives and processes the redirection response 907' from the SBC 106. As part of the processing the user device 102 analyses the message contents and concludes that it did not send an INVITE message and thus need not send a new INVITE message in response to the redirection response 907'. Thus the user device 102 does not respond by sending new redirected INVITE. As should be appreciated from FIG. 10, since no new INVITE message is sent from user device 102 due to the above discussed reasons, no signaling corresponding to signal 911 is shown.

The SBC 106 after sending the redirection response 907' monitors for a new INVITE message from the user device 102, e.g., for a preconfigured time period. In step 912' following the expiration of the preconfigured time period when the SBC 106 does not receive a new INVITE at the indicated signaling port, the SBC 106 concludes that spoofing has occurred. Based on the conclusion the SBC 106 decides that the requested action in the original INVITE 903', e.g., call establishment, should not be completed and further processing with regard to the requested action should be terminated. Thus in accordance with the features of the invention the SBC 106 drops the INVITE message 903' received from the attacker device 110 and does not allow the requested action in INVITE message 903' to be completed. As should be appreciated from the figure, due to the above discussed reasons no processing and signaling corresponding to step 914 and signal 915 of FIG. 9 is shown in the example of FIG. 10.

FIG. 11 is a flowchart illustrating the steps of a second subroutine 1100 for performing INVITE message spoofing check, e.g., for a received INVITE message, in accordance with another exemplary embodiment. In some embodiments the subroutine 1100 is executed and implemented by the SBC 106, upon deciding that spoofing check is to be performed for a received INVITE message. In some embodiments the SBC 106 allows the action requested in a received INVITE message, e.g., call setup/establishment, to proceed depending on the outcome of the INVITE message spoofing check performed in accordance with flowchart 1100 as will be discussed.

Operation starts in step 1102 where the call to the subroutine is made. Operation proceeds from start step 1102 to step 1104. In step 1104 the received INVITE message is processed by the SBC, e.g., to recover the message and analyze one or more message fields.

Operation proceeds from step 1104 to step 1106. In accordance with one feature of an embodiment of the invention, in step 1106 the SBC 106 sends an update request message following sending an initial information response message, e.g., 18x response, from the SBC 106. The update request message is directed to the sender IP address included in the received INVITE message. In simple terms the update request indicates that the recipient of the INVITE message (e.g., SBC 106) wants to verify the IP address and/or IP address port combination of the sender of the INVITE message and check if the device is present at the other end. The update request is sent to the sender's IP address included in the INVITE message with an understanding that if spoofing has occurred and the recipient of the update message did not send the original INVITE message, the recipient will not respond to the update request and thus it can be concluded that the INVITE was either not sent by a user device corresponding to the IP address or no device is present corresponding to the IP address included in the INVITE message thereby indicating that spoofing has taken place. In various embodiments the SBC expects to receive a positive reply, e.g., 200 OK, in response to such an update request.

Operation proceeds from step 1106 to step 1108. Following communication of the update request message, in step 1108 the SBC 106 starts monitoring for a response, e.g., a 200 OK reply, to the update request from the sender. In some embodiments the monitoring for the response is performed for a limited time, e.g., for a predetermined amount of time. Operation proceeds from step 1108 to step 1110.

In step 1110 the SBC determines whether or not the expected response is received at the SBC. If it is determined that the expected response, e.g., 200 OK, is received the operation proceeds from step 1110 to step 1112 otherwise the operation proceeds to step 1114. If the expected response is received, it indicates to the SBC 106 that the device at the other end received the update and in the response message, the SBC 106 gets the replying device's address. In some embodiments when a reply as a 200 OK is received the address is specified by the contact header.

Following receipt of the update response from the user device, in step 1112 the SBC concludes that no spoofing has occurred and facilitates completion of the action requested in the INVITE request, e.g., call establishment. In some embodiments this includes communicating with the SIP registrar/application server 108 to facilitate call setup. Operation proceeds from step 1112 to step 1116.

If in step 1110 it is determined that no response to the update request is received the operation proceeds from step 1110 to step 1114. In step 1114 the SBC concludes that spoofing has occurred and/or suspected and thus decides that the action requested, e.g., call setup, in the INVITE request should not be completed. In various embodiments when it is concluded that spoofing has occurred the SBC decides not to initiate the requested action and/or terminate the process if an action has been taken to complete the requested action, e.g., terminate call establishment process. Operation proceeds from step 1114 to step 1116.

Returning to step 1116. In step 1116 the SBC includes and/or updates sender IP address and/or IP address/port combination information in a database along with other relevant information corresponding to the sender IP address and/or IP address/port combination. In some embodiments the exemplary database includes information corresponding to various sender IP addresses and/or IP address/port combinations which have been included in the INVITE messages processed by the SBC 106. In some embodiments the database is updated after processing a new INVITE message to include information corresponding to sender IP addresses/ or IP address/port combinations regardless of whether spoofing has occurred or not. The processing in step 1116 is the same or similar to the processing discussed in step 816 and thus will not be discussed in detail again.

Figure 12:
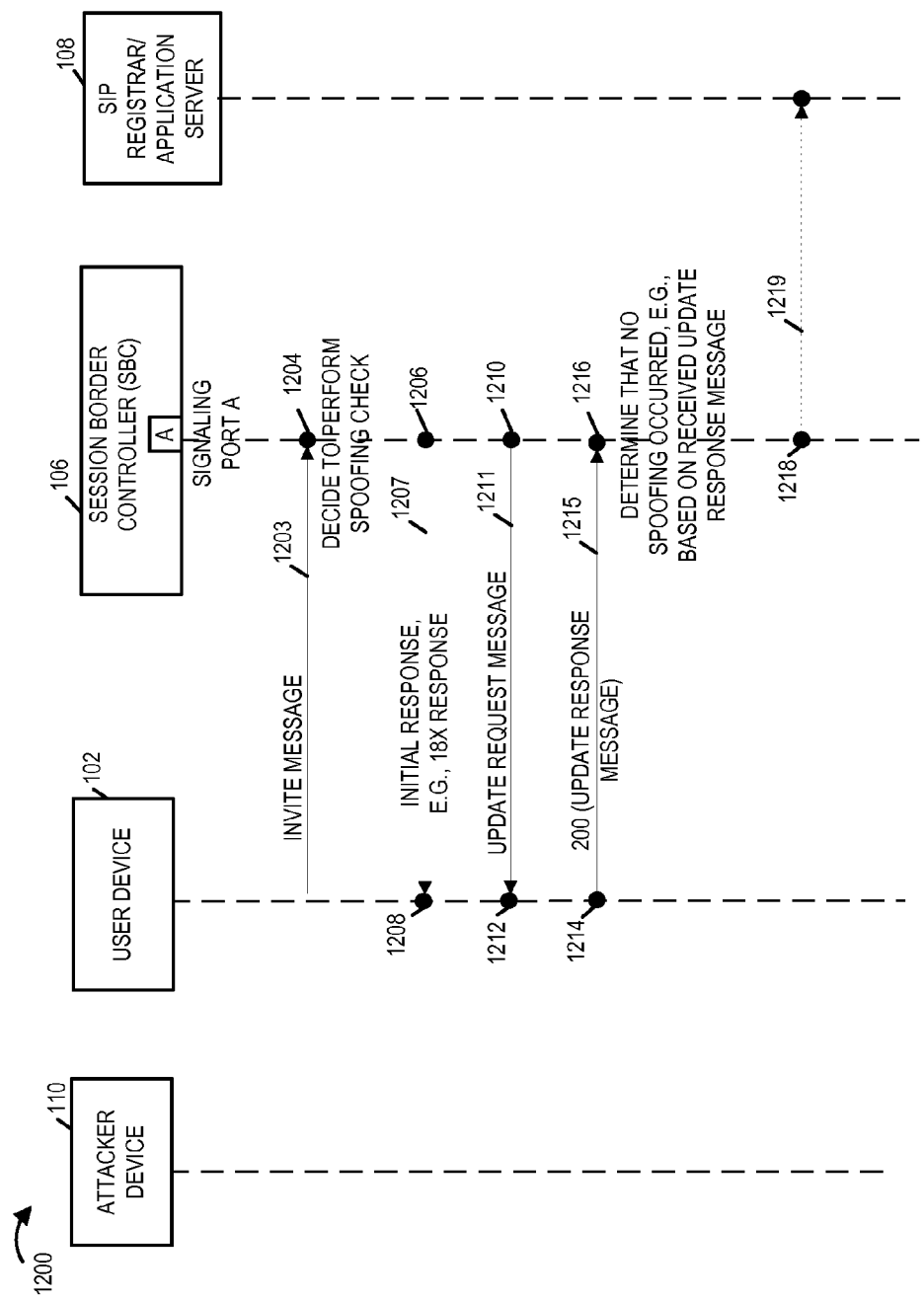
FIG. 12 illustrates the steps and associated signaling exchange between various devices/servers performed in a second exemplary INVITE message maliciousness check process in an exemplary case where spoofing does not occur.

FIG. 12 is a drawing 1200 illustrating the steps and associated signaling exchange between various devices/ servers performed in an exemplary INVITE message spoofing check process such as the one illustrated in flowchart 1100 implemented using the system shown in FIG. 1. FIG. 12 illustrates a case where no spoofing takes place as the INVITE is sent by a genuine user device as opposed to an attacker device. Messages, information, content and/or signals communicated between devices are represented using arrows. At the top of FIG. 12, various elements of the system 100 which may participate in the exemplary INVITE message spoofing check process in accordance with one embodiment of the invention, are shown. The illustrated components include the attacker device 110, the user device 102, the SBC 106, and the SIP registrar/application server 108.

The process starts in step 1204 with the SBC 106 receiving an INVITE message 1203 from the user device 102. From the perspective of the SBC 106, it is not known whether the INVITE message is sent by a genuine user or it is part of an attempted spoofing attack from a malicious attacker device such as device 110. The SBC receives and processes the INVITE message in step 1204. As part of the processing, in some embodiments the SBC 106 analyses the received message to check if the message is malformed and/or appears suspicious. Furthermore in step 1204 the SBC 106 makes a decision whether or not a spoofing check should be performed. The processing performed in step 1204 is similar to the processing performed on a received INVITE request discussed with regard to step 904 and processing discussed with regard to steps 704, 706 and 708 of flowchart 700 and therefore will not be discussed again to avoid repetition. Consider that as part of the processing in step 1204 the SBC 106 decides that a INVITE message spoofing check is to be performed.

Following making the decision that spoofing check is to be performed, in step 1206 the SBC sends an initial response message 1207, e.g., an 18x class information response such as 180 ringing, 183 progress. The response is directed to the sender IP address included in the received INVITE request message field carrying address corresponding to the sender. The initial response message 1207 indicates to the receiving device that the INVITE request has reached at least one endpoint and the called party is being alerted that a device is trying to contact and/or there's a call coming in.

Figure 13:
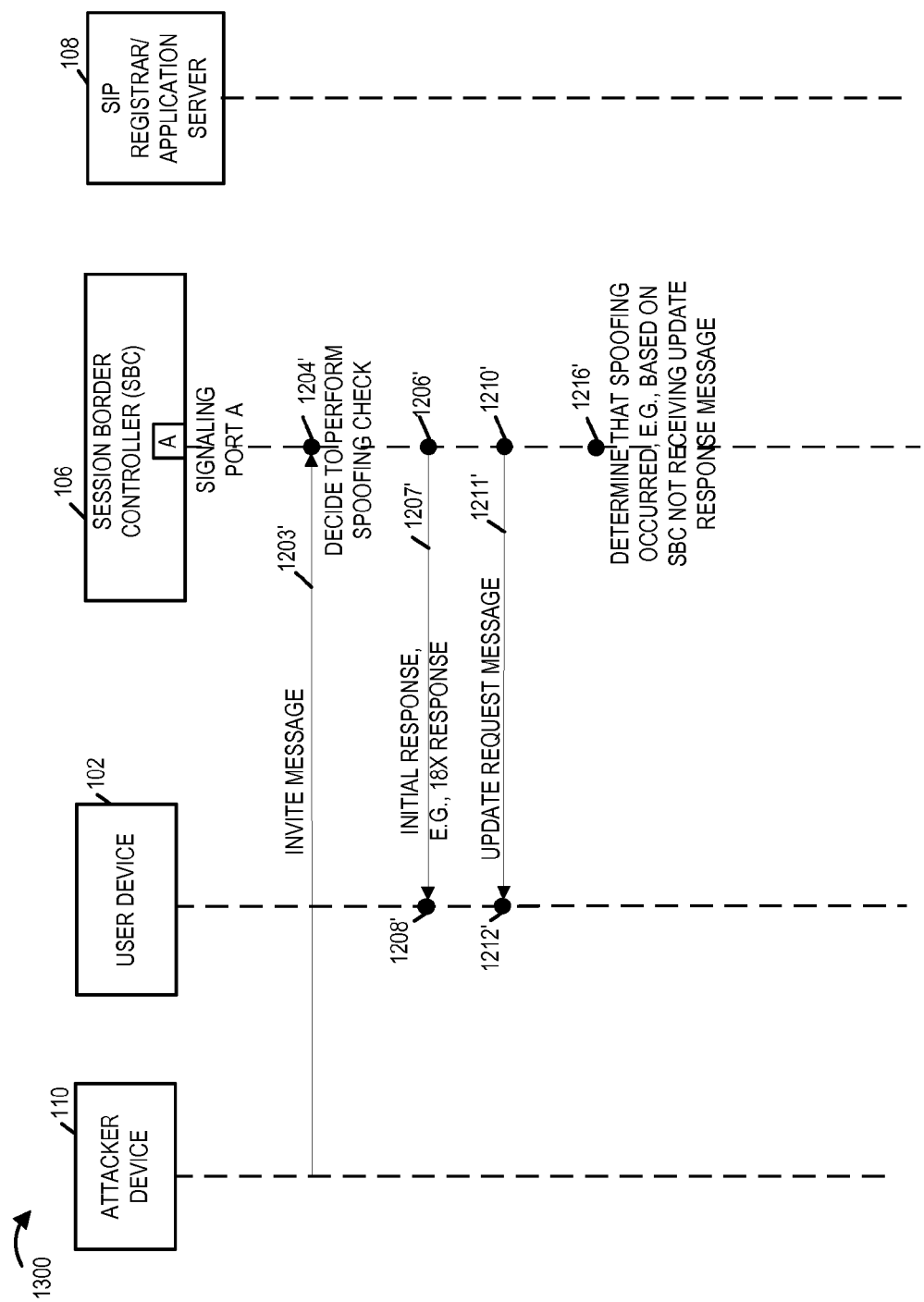
FIG. 13 illustrates the steps and associated signaling exchange between various devices/servers in the second exemplary INVITE message maliciousness check process in a case where spoofing or another malicious activity occurs.

In step 1208 the user device 102 receives and processes the response 1207 from the SBC 106. It should be noted that since in FIG. 12 example no spoofing is taking place the response 1207 is received by the same device that sent the INVITE message 1203. However this is not true in cases where spoofing is taking place since in such cases the attacker device that sends the INVITE will not receive the redirection response sent by the SBC 106. Such a spoofing case is illustrated in FIG. 13 and discussed later. The user device 102 receiving the initial response 1207 does not take any action on its part but understands that the INVITE request has reached an SIP server and the other party is being alerted.

Next in step 1210 the SBC 106 sends an exemplary update request message 1211 directed to the sender IP address included in the received INVITE message. Such an exemplary update request message is discussed in detail in step 1106 in flowchart 1100. The update request indicates that the recipient of the INVITE message (e.g., SBC 106) wants to verify the IP address and/or IP address port combination of the sender of the INVITE message and check if the device is present at the other end. In various embodiments in step 1210 after sending the update request 1211 the SBC 106 starts monitoring for a response, e.g., a 200 OK reply, to the update request as the SBC 106 expects to receive a positive reply, e.g., 200 OK, in response to such an update request provided that a genuine user device is present at the receiving end of the update request 1211. In some embodiments the monitoring for the response is performed for a limited time, e.g., for a predetermined amount of time.

In step 1212 the user device 102 receives and processes the update request 1211. The user device determines that it needs to respond to the update request. Accordingly in step 1214 the user device 102 sends an update response 1215, e.g., 200 OK, to the SBC 106 in response to the update request 1211.

In step 1216 the SBC 106 receives and processes the update response 1215 and determines that the expected response has been successfully received from the INVITE request sending part. Since the expected response is received from the user device, in step 1216 the SBC concludes that no spoofing is taking place with regard to the INVITE request 1203 and accordingly facilitates completion of the action requested in the INVITE request, e.g., call establishment. In some embodiments this includes communicating with the SIP registrar/application server 108 to facilitate call setup. Accordingly in some embodiments the SBC sends a signal 1219 to the SIP registrar/application server 108 to facilitate call setup FIG. 13 is a drawing 1300 illustrating the steps and associated signaling exchange between various devices/servers in an exemplary INVITE message spoofing check process in a case where spoofing occurs. In contrast to the FIG. 12 example, FIG. 13 embodiment illustrates signaling in a case where spoofing occurs as the INVITE message is sent by an attacker device resulting in some different signaling and process outcomes. For the purposes of discussion consider that the attacker device 110 somehow obtains and uses the IP address corresponding to the user device 102 for sending spoofing messages. The elements of system 100 which may participate in the illustrated process have been shown on the top. The steps and signaling in the FIG. 13 example which are similar to the steps and signaling of FIG. 12 have been labeled with the same reference number but ending with a prime (').

The process starts in step 1204' where the SBC 106 receives an INVITE message 1203' from the attacker device 110. From the perspective of the SBC 106, it is not known whether the registration request is from a device with genuine intentions for, e.g., call setup or request another action, or it is part of an attempted spoofing attack from the attacker device 110. The SBC 106 receives and processes the INVITE message 1203' in step 1204'. The processing is same or similar to that discussed in step 1204 of FIG. 12 in detail and thus will not be discussed again. As part of the processing, the SBC 106 makes a decision that a INVITE request spoofing check should be performed.

Following making the decision that spoofing check is to be performed, in step 1206' the SBC sends an initial response message 1207', e.g., an 18x response, directed to the sender IP address included in the received INVITE request message field carrying address corresponding to the sender as discussed with regard to step 1206 of FIG. 12. Next in step 1208' the user device 102 receives and processes the response 1207' from the SBC 106. As part of the processing the user device 102 analyses the response message contents but does not take an action.

In step 1210' the SBC 106 sends the exemplary update request message 1211' directed to the sender IP address included in the received INVITE message. The update request 1211' is the same as or similar to the update request 1211 discussed above. It should be noted that since in the FIG. 13 example the attacker device 110 used the IP address corresponding to user device 102 as the sender address in the INVITE message 1203', therefore as illustrated in the figure the response 1207' and update request 1211' are both directed to the user device 102 whose IP address is identified as the sender address in the INVITE request 1203' and not to the attacker device 110 which actually sent the INVITE request. Thus the attacker device 110 does not receive the response 1207' and the update request 1211'. In various embodiments in step 1210' after sending the update request 1211' the SBC 106 starts monitoring for a response, e.g., a 200 OK reply, to the update request. In some embodiments the monitoring for the response is performed for a limited time, e.g., for a predetermined amount of time.

In step 1212' the user device 102 receives and processes the updates request 1211'. In processing the received update request 1211' the user device 102 in some embodiments decides not to respond back to the update request since the user device 102 is aware that it did not send/initiate an INVITE request for which the update request 1211' is received. In some embodiments the user device 102 replies with an error response indicating that it does not know/recognize the INVITE request. Thus the user device 102 either sends an error response or does not send a positive reply in response to the update request. Assuming for the example of FIG. 13 that no reply is sent from user device 102 due to the above discussed reasons, no signaling corresponding to signal 1215 is shown in FIG. 13.

In step 1216' following the expiration of the monitoring time period when the SBC 106 does not receive an expected response to the update request 1211', the SBC 106 concludes that spoofing is taking place. Based on the conclusion the SBC 106 decides that the requested action in the original INVITE 1203', e.g., call establishment, should not be completed and further processing with regard to the requested action should be terminated. Thus in accordance with the features of the invention the SBC 106 drops the INVITE message 1203' received from the attacker device 110 and does not allow the requested action in INVITE message 1203' to be completed. As should be appreciated from the figure, due to the above discussed reasons no processing and signaling corresponding to step 1218 and signal 1219 of FIG. 12 is shown in the example of FIG. 13.

FIG. 14 is a flowchart illustrating the steps of a third subroutine 1400 for performing INVITE message spoofing check, e.g., for a received INVITE message, in accordance with yet another exemplary embodiment. In some embodiments the subroutine 1400 is executed and implemented by the SBC 106, upon deciding that spoofing check is to be performed for a received INVITE message. In some embodiments the SBC 106 allows the action requested in a received INVITE message, e.g., call setup/establishment, to proceed depending on the outcome of the INVITE message spoofing check performed in accordance with flowchart 1400 as will be discussed.

Operation starts in step 1402 where the call to the subroutine 1400 is made. Operation proceeds from start step 1402 to step 1404. In step 1404 a received INVITE message is processed by the SBC, e.g., to recover the message and analyze one or more message fields.

Operation proceeds from step 1404 to step 1406. In accordance with one feature of an embodiment of the invention, in step 1406 the SBC 106 sends an initial response message, e.g., 18x response, directed to the sender IP address included in the received INVITE message. In some embodiments the 18x response is one of the 18x class messages such as, e.g., 180 ringing. The initial response message indicates to the receiving device that the INVITE request has reached at least one endpoint and the called party is being alerted that a device is trying to contact.

Operation proceeds from step 1406 to step 1408. In step 1408 the SBC sends a positive response, e.g., 200 OK, directed to the sender IP address included in the received INVITE message. The positive response indicates to the receiving device, e.g., user device to which the 200 OK is sent, that the INVITE request has been successfully received. In various embodiments the positive response also indicates a contact address corresponding to the sender of the positive response, e.g., in a contact header.

The 200 OK response requires the receiving device to respond back with an ACK message (acknowledgment signal) at the contact address. Thus after the step 1408 of sending the positive response the operation proceeds to step 1410 where the SBC 106 starts monitoring for an ACK message. In accordance with various embodiments the time period within which the expected ACK should be received is preconfigured and thus the monitoring operation performed for a preconfigured amount of time.

Operation proceeds from step 1410 to step 1412. In step 1412 the SBC 106 determines if an ACK message in response to the positive response message is received at the SBC within the predetermined time period. If it is determined that the ACK message is received within the time period the operation proceeds from step 1412 to step 1414 otherwise the operation proceeds to step 1416. In various embodiments an ACK message received from the user device in response to the 200 OK response confirms that there is a real device at the other end that sent the INVITE request since it is receiving the response messages sent by the SBC 106. The ACK also confirms that the signaling from the user device at the other end can reach SBC 106 and/or the called party that replied to the INVITE message.

Following receipt of an ACK from the user device, in step 1414 the SBC concludes that no spoofing has occurred and facilitates completion of the action requested in the INVITE request, e.g., call establishment. In some embodiments this includes communicating with the SIP registrar/application server 108 to facilitate call setup. Operation proceeds from step 1414 to step 1418.

If in step 1412 it is determined that no ACK is received the operation proceeds from step 1412 to step 1416. In step 1416 the SBC concludes that spoofing has occurred and/or suspected and thus decides that the action requested, e.g., call setup, in the INVITE request should not be completed. In various embodiments when it is concluded that spoofing has occurred the SBC decides not to initiate the requested action and/or terminate the process if an action has been taken to complete the requested action, e.g., terminate call establishment process. Operation proceeds from step 1416 to step 1418.

Returning to step 1418. In step 1418 the SBC includes and/or updates sender IP address and/or IP address/port combination information in a database along with other relevant information corresponding to the sender IP address and/or IP address/port combination. In some embodiments the exemplary database includes information corresponding to various sender IP addresses and/or IP address/port combinations which have been included in the INVITE messages processed by the SBC 106. In some embodiments the database is updated after processing each new INVITE message to include information corresponding to sender IP addresses and/or IP address/port combinations regardless of whether spoofing has occurred or not. The processing in step 1418 is the same or similar to the processing discussed with regard to steps 816 and 1116 and thus will not be discussed in detail again.

Figure 15:
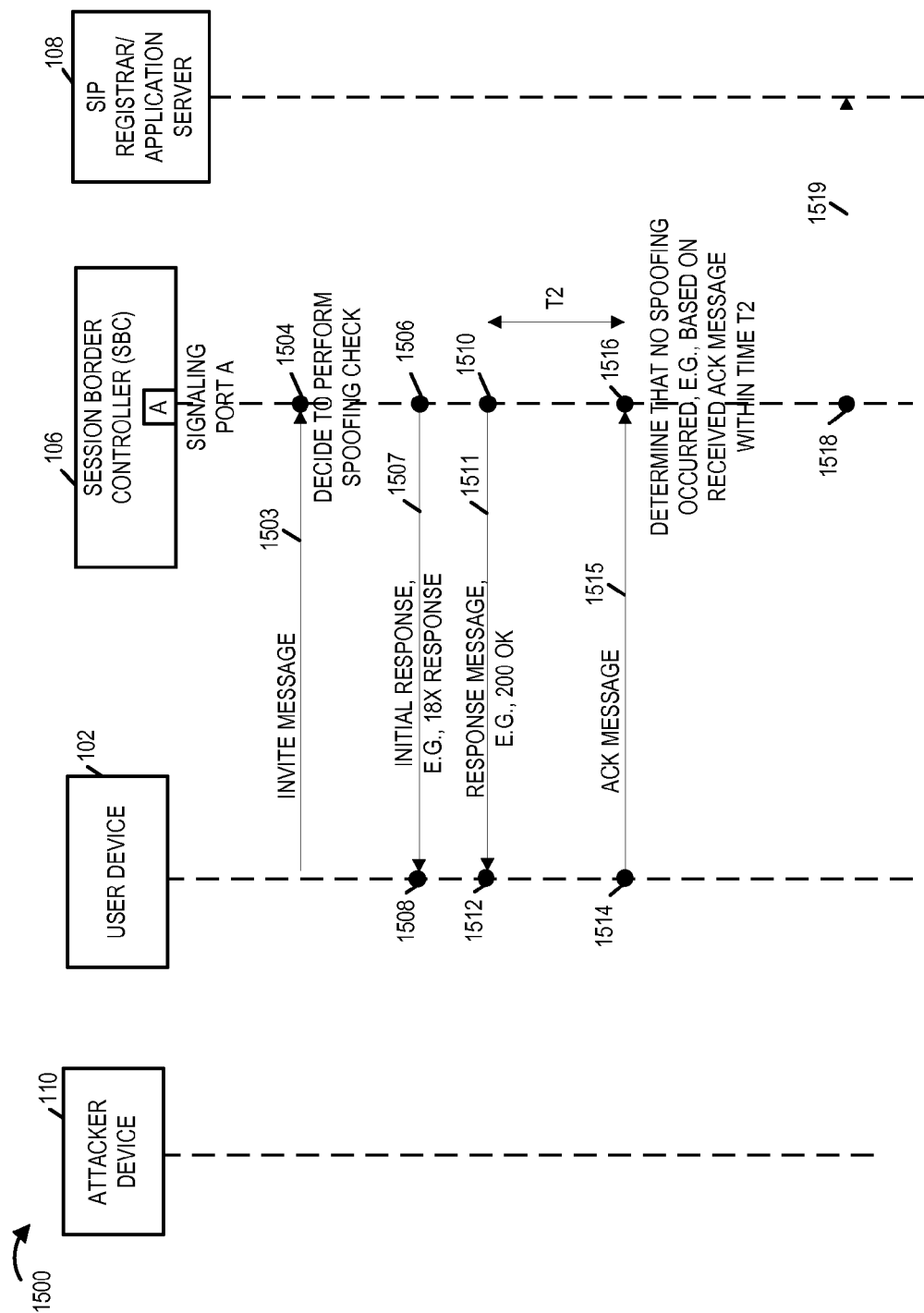
FIG. 15 illustrates the steps and associated signaling exchange between various devices/servers performed in a third exemplary INVITE message maliciousness check process in an exemplary case where spoofing or other malicious activity does not occur.

FIG. 15 illustrates the steps and associated signaling exchange between various devices/servers performed in an exemplary INVITE message spoofing check process such as the one illustrated in flowchart 1400 implemented using the system shown in FIG. 1. FIG. 14 illustrates a case where no spoofing takes place as the INVITE is sent by a genuine user device as opposed to an attacker device. Messages, information, content and/or signals communicated between devices are represented using arrows. At the top of FIG. 15, various elements of the system 100 which may participate in the exemplary INVITE message spoofing check process in accordance with one embodiment of the invention, are shown. The illustrated components include the attacker device 110, the user device 102, the SBC 106, and the SIP registrar/application server 108.

The process starts in step 1504 with the SBC 106 receiving an INVITE message 1503 from the user device 102. From the perspective of the SBC 106, it is not known whether the INVITE message is sent by a genuine user or by an attacker device such as device 110. The SBC receives and processes the INVITE message in step 1504. As part of the processing, in some embodiments the SBC 106 analyses the received message to check if the message is malformed and/or appears suspicious and makes a decision whether or not a spoofing check should be performed. The processing performed in step 1504 is similar to the processing performed on a received INVITE request discussed with regard to steps 904 and/or 1204 and processing discussed with regard to steps 704, 706 and 708 of flowchart 700 and therefore will not be discussed again to avoid repetition. Consider that as part of the processing in step 1504 the SBC 106 decides that a INVITE message spoofing check is to be performed.

Following making the decision that spoofing check is to be performed, in step 1506 the SBC sends an initial response message 1507, e.g., an 18x class response such as 180 ringing. The response is directed to the sender IP address included in the received INVITE request message field carrying address corresponding to the sender. The initial response message 1507 indicates to the receiving device that the INVITE request has reached at least one endpoint and the called party is being alerted that a device is trying to contact and/or there's a call coming in.

Figure 16:
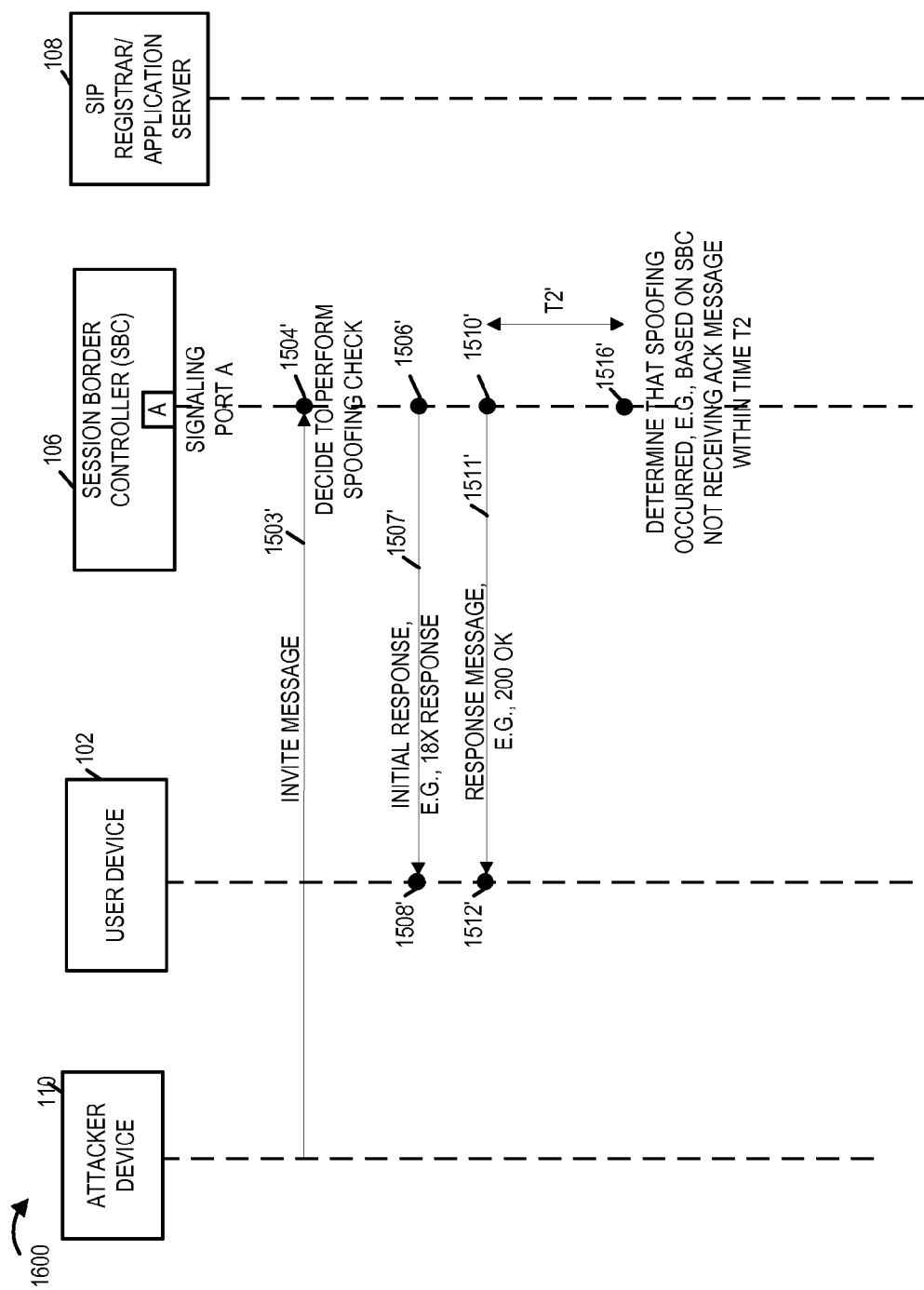
FIG. 16 illustrates the steps and associated signaling exchange between various devices/servers in the third exemplary INVITE message maliciousness check process in a case where a malicious activity, e.g., spoofing, occurs.

In step 1508 the user device 102 receives and processes the response 1507 from the SBC 106. It should be appreciated that since in the FIG. 15 example no spoofing is taking place the response 1507 is received at the user device 102 which is the same device that sent the INVITE message 1503. The same is not true in cases where spoofing is taking place since in such cases the attacker device that sends the INVITE will not receive the response sent by the SBC 106. Such a spoofing case is illustrated in FIG. 16. The user device 102 receiving the initial response 1507 does not take any action on its part but understands that the INVITE request has reached an SIP server and the other party is being alerted.

Next in step 1510 the SBC 106 sends a positive response message 1511, e.g., 200 OK, directed to the sender IP address included in the received INVITE message 1503. This is discussed with regard to the corresponding step 1408 of flowchart 1400. The positive response 1511 indicates to the user device 102 that the INVITE request has been successfully received and indicates a contact address corresponding to the sender of the positive response 1511, e.g., in a contact header.

The 200 OK response requires the receiving device to respond back with an ACK message (acknowledgment signal) at the contact address indicated in the response message 1511. Thus after sending the 200 OK response 1511 the SBC 106 starts monitoring for an ACK message. In accordance with various embodiments the time period within which the expected ACK should be received is preconfigured and thus the monitoring operation is performed for a preconfigured amount of time, e.g., time period T2.

In step 1512 the user device 102 receives and processes the response 1511. From the positive response 1511 the user device 102 determines that it needs to reply to the response 1511 with an ACK message. Accordingly in step 1514 the user device 102 sends an ACK message 1515. From the perspective of user device 102, it sends the ACK message 1515 to confirm that the signaling from the user device 102 can reach SBC 106 and/or the called party that replied to the INVITE message.

Next in step 1516 the SBC 106 receives the ACK message 1511 and determines that the expected ACK 1511 is received within the predetermined time period T2. In accordance with one aspect of some embodiments, receiving the ACK message within the time period T2 confirms to the SBC 106 that there is a real device at the other end that sent the INVITE request since it is receiving and responding to the response messages sent by the SBC 106. Following receipt of the ACK message 1511 from the user device, the SBC concludes that no spoofing has occurred and facilitates completion of the action requested in the INVITE request, e.g., call establishment. In some embodiments this includes communicating with the SIP registrar/application server 108 to facilitate call setup. Accordingly in some embodiments the SBC 106 sends a signal 1519 to the SIP registrar/application server 108 to facilitate call setup. Furthermore in some embodiments the SBC 106 also updates sender IP address and/or IP address/port combination information in a database along with other relevant information corresponding to the sender IP address and/or IP address/port combination.

FIG. 16 is a drawing 1600 illustrating the steps and associated signaling exchange between various devices/servers in an exemplary INVITE message spoofing check process in a case where spoofing occurs. In contrast to the FIG. 15 example, FIG. 16 example illustrates signaling in a case where spoofing occurs as the INVITE message is sent by an attacker device resulting in some different signaling and process outcomes. For the purposes of discussion consider that the attacker device 110 somehow obtains and uses the IP address corresponding to the user device 102 for sending spoofing messages. The elements of system 100 which may participate in the illustrated process have been shown on the top. The steps and signaling in FIG. 16 example which are similar to the steps and signaling of FIG. 12 have been labeled with the same reference number but ending with a prime (').

The process starts in step 1504' where the SBC 106 receives an INVITE message 1503' from the attacker device 110. Again, from the perspective of the SBC 106 it is not known whether the registration request is from a device with genuine intentions for, e.g., call setup or request another action, or from the attacker device 110. The SBC 106 receives and processes the INVITE message 1503' in step 1504'. The processing is same or similar to that discussed in step 1504 of FIG. 15 in detail and thus will not be discussed again. As part of the processing, the SBC 106 makes a decision that a INVITE request spoofing check should be performed.

Following making the decision that spoofing check is to be performed, in step 1506' the SBC sends an initial response message 1507', e.g., an 18x response, directed to the sender IP address included in the received INVITE request message field carrying the address corresponding to the sender which in this case corresponds to the user device 102 since the attacker device 110 used address of the user device 102 in the INVITE 1503'. The user device 102 receives and processes the initial response 1207' in step 1508'. As part of the processing the user device 102 analyses the response message 1207' but does not take an action.

In step 1510' the SBC 106 sends a positive response message 1511', e.g., 200 OK, directed to the sender IP address included in the received INVITE message 1503'. The positive response 1511' indicates to the user device 102 that the INVITE request has been successfully received and indicates a contact address corresponding to the sender of the positive response 1511', e.g., in a contact header. As discussed with regard to FIG. 15 example, the 200 OK response requires the receiving device to respond back with an ACK message (acknowledgment signal) at the contact address indicated in the response message 1511'. Thus the SBC 106 starts monitoring for an ACK message, e.g., for a preconfigured time interval T2' after sending the 200 OK response 1511'.

In step 1512' the user device 102 receives and processes the response 1511'. The user device 102 realizes that the 200 OK response does not belong to the user device 102 since it did not send the corresponding INVITE request 1503'. Thus in step 1512' the user device 102 decides not to respond back with an ACK. Accordingly the user device 102 does not send an ACK message to the SBC 106. As should be appreciated from FIG. 16, since no ACK message is sent from user device 102 due to the above discussed reasons, no signaling corresponding to signal 1515 is shown in FIG. 16.

In step 1516' following the expiration of the monitoring time period T2' when the SBC 106 does not receive the expected ACK message, the SBC 106 concludes that spoofing is taking place. Based on the conclusion the SBC 106 decides that the requested action in the original INVITE 1503', e.g., call establishment, should not be completed and further processing with regard to the requested action should be terminated. Thus in accordance with the features of the invention in some embodiments the SBC 106 drops the INVITE message 1503' received from the attacker device 110 and does not allow the requested action in INVITE message 1503' to be completed. As should be appreciated from the figure, due to the above discussed reasons no processing and signaling corresponding to step 1518 and signal 1519 of FIG. 15 is shown in the example of FIG. 16. Furthermore in some embodiments in step 1516' the SBC 106 updates sender IP address and/or IP address/port combination information in a database along with other relevant information corresponding to the sender IP address and/or IP address/port combination.

FIG. 17 illustrates an exemplary database 1700 including information corresponding to various IP addresses and/or IP address/port pairs which have been included in the messages, e.g., REGISTRATION, INVITE etc., processed by an exemplary session border controller. In accordance with one aspect of the invention the database 1700 is built by aggregating information when maliciousness check, e.g., spoofing check, is performed on various messages. As will be discussed the database 1700 includes variety of information generated, e.g., by the SBC 106, when spoofing check in accordance with the invention is performed. The database 1700 can be, and in some embodiments is, used to decide how future calls should be handled and/or affect the disposition of future calls independent of a test outcome for any particular future call. In some embodiments the exemplary database 1700 is implemented as an external database while in some other embodiments it is implemented as part of the SBC 106.

The information included in the database 1700 can be, and in some embodiments is, used by, e.g., a service provider/operator to control how calls should be handled. The SBC 106 performs spoofing check on various types of incoming messages in accordance with the features of the invention and in some embodiments categorizes the IP address and port corresponding to the source identified in the messages based on the outcome of the spoofing check. Thus the IP address and/or IP addresses/port combinations used in processed messages, e.g., REGISTER, INVITE, or other messages, can be identified and labeled as, for example, suspicious, trusted, malicious etc., based on the pattern and/or history of messages received from such addresses in the past.

Each entry in column 1702 indicates an IP address included in a message received and processed by the SBC, with each of the rows 1720, 1722, 1724, . . . , corresponding to different IP addresses indicated in column 1702. Note that several entries exist in subsequent columns 1704, 1706, 1708, 1710 and 1712 for each IP address included in column 1702 with an entry for each received message. Thus row 1720 corresponds to an exemplary IP address 198.0.X.X for which multiple messages are listed in column 1706, row 1722 corresponds to an exemplary IP address 192.0.2.Y, row 1724 corresponds to an exemplary IP address 192.0.Y.X, and so forth. Each entry in column 1704 indicates a port number at which a corresponding message, identified in column 1706, is received at the SBC. Each entry in column 1706 indicates the type of message received by the SBC at the corresponding port number shown in column 1704, each message including the corresponding IP address shown in column 1702 as corresponding to the sender of the message. Each entry in column 1708 indicates a time of receipt of the corresponding message. Each entry in column 1710 indicates the outcome of a spoofing check performed to check if the corresponding message corresponds to a spoofing attack in accordance with the invention. Each entry in column 1712 indicates an action taken by the SBC 106 as a result of performing the spoofing check and based on the outcome of the spoofing check.

Consider the first row 1720 corresponding to IP address "198.0.X.X" and the first entry in each of the columns 1704, 1706, 1708, 1710 and 1712. For 198.0.X.X, the first entry in column 1704 identifies an exemplary port number "0125XX" at which the message was received at the SBC. The first entry in column 1706 indicates that the received message is a REGISTRATION message, received at the time (21:49:23) indicated by the corresponding entry in column 1708. The corresponding entry in column 1710 indicates the outcome of a spoofing check which in this case indicates that the expected responses were received. Thus the performed spoofing check indicates that the device at the other end responded with expected replies to the messages sent from the SBC as part of the spoofing check process. The first entry in column 1712 indicates the action taken by the SBC for the corresponding Registration message of the first row.

Next further consider first row 1720 corresponding to the same IP address "198.0.X.X" which has multiple entries. The second entry in each of the columns 1704, 1706, 1708, 1710 and 1712. This combination corresponds to another, e.g., second, message from the IP address "198.0.X.X" received by the SBC. The corresponding second entry in column 1704 identifies the exemplary port number "1234XX" at which the message was received at the SBC. The corresponding second entry in column 1706 indicates that the received message is an INVITE message, received at the time (21:55:30) indicated by the corresponding entry in column 1708. The corresponding second entry in column 1710 indicates the outcome of a spoofing check which in the case of the INVITE message indicates that the expected responses were not received but a reply for a SIP request received. In some embodiments when expected responses are not received as part of the spoofing check, the SBC sends a SIP messages, e.g., an OPTIONS request or another SIP request message, to the sender IP address. A reply for such a request indicates that there is at least an entity, e.g., device, at the IP address under consideration. The subsequent request sent to the sender IP address in some embodiments as an additional step in order to gather more information about a suspected IP address.

The second entry in column 1712 indicates the action taken by the SBC for the corresponding INVITE message.

Various actions may be taken in response to received messages as shown in column 1712 which shows the action taken given the output come the spoofing check shown in column 1710 of the corresponding row.

For example, the action might include allowing the session to proceed and marking the IP address port combination as legitimate, e.g., in the case where expected responses relating to an invite or registration message are not received but a reply to a subsequent test message sent to the IP address port combination is received, the action may be to mark the IP/address port suspect. In the case where expected responses are not received and a reply to a subsequent test message sent to the IP address/port combination is not received, the action may and sometimes is, to black list the IP/port address making it as invalid and subjecting it to blocking/dropping of messages in the future.

In some embodiments, for attacks based on INVITE requests, the SBC sends a 3xx redirection response with a proprietary parameter in the Contact header. The value of this parameter is random and a new value would be used for each redirection. Redirection would happen to another signaling port on the same SBC. If a new INVITE with the special parameter and the correct value is received on the alternate signaling port before a preconfigured amount of time, it can be concluded that no IP spoofing is taking place.

In some other embodiments, for attacks based on INVITE request, e.g., malformed INVITE request, an UPDATE request is sent after an initial response, e.g., 18x response. If a response is received for the UPDATE request, it can be concluded that no IP spoofing is taking place.

In still some embodiments, for attacks based on INVITE request, the SBC determines whether an ACK is received within a specified limit in response to a positive/success reply sent from the SBC. If the ACK is received within expected time it can be concluded that there is no spoofing.

In some embodiments, for attacks based on REGISTER request, e.g. malformed REGISTER request, abandoned registration, a 200 reply with a short expiration value is sent. If a refresh REGISTER request is received around the time consistent with the provided expiration value, it can be concluded that no IP spoofing is taking place.

For various scenarios discussed above, the SBC can, and in some embodiments does, either treat received requests as legitimate and relay them to the egress leg or consider the call/registration only as a test procedure and not relay one or more messages to egress leg and generate all requests/replies autonomously.

In some embodiments when the SBC performing a maliciousness, e.g., spoofing, check does not receive the expected replies, the SBC sends some SIP requests, e.g., an OPTIONS request, an INVITE request, to the suspect IP Address/port. A reply from the device receiving such SIP requests would indicate that there at least a SIP entity on the address under consideration. The SBC monitors for the expected reply or other response and notes, e.g., in the database 1700 whether the respected response, e.g., reply, was received, Thus in this manner various features of the invention provide ways to gather more information about a suspected IP address/port corresponding to a message and/or packet which was determined to be malicious.

In accordance with one aspect of some embodiments of the invention, the IP Address/ports are categorized in, for example, one the three categories: 1) Expected responses received, 2) Expected responses not received but reply for another SIP request is received, and 3) Neither expected responses nor responses for other SIP request are received.

An exemplary method of operating a communications device, in accordance with an exemplary embodiment comprises: receiving a first invite message including sender contact information including a sender address; sending a message directed to said sender address in response to said first invite message; monitoring for a period of time to detect receipt of a response to said message directed to said sender address; making, when said monitoring detects receipt of a response to said message directed to said sender address, a determination as to whether said first invite message does not correspond to a malicious, e.g., spoofing, operation or may correspond to a malicious operation based on the detected response; and making, when said monitoring does not detect a response to said message directed to said sender address, a determination that said received first invite message may correspond to a spoofing operation. In some embodiments the communication device is a session border controller, and the first invite message is a SIP (Session Initiation Protocol) message. The steps corresponding to one such exemplary method where a received INVITE request is processed are discussed in FIGS. 8, 11, and 14

In some embodiments the method further includes updating a set of network spoofing information when it is determined that that said received first invite message may correspond to a spoofing operation.

In some embodiments sending the message to the sender address in response to said first invite message includes sending a redirect message (e.g., see FIG. 8 embodiment) including an address and port to which communication is being redirected. In some such embodiments monitoring for a period of time to detect receipt of a response to said message directed to said sender address includes monitoring for a second invite message corresponding to said sender address and said redirect message. In some embodiments making a determination as to whether said first invite message does not correspond to a malicious operation or may correspond to a malicious operation based on the detected response, includes: determining if the second invite message is received on the address and port combination specified in said redirect message; and determining that said invite message may correspond to a malicious operation when it is determined that said detected response is not received on the address and port combination specified in said redirect message. In some embodiments making a determination as to whether said first invite message does not correspond to a malicious operation or may correspond to a malicious operation based on the detected response, includes: checking if the second invite includes a nonce (e.g. randomly generated value included for security purposes) included in said redirect message by said communications device; and determining that said first invite message may correspond to a spoofing operation when it is determined that said second invite message does not include said nonce that was included in the redirect message.

In some embodiments sending a message directed to the sender address in response to said first invite message includes: sending an update request message directed to the sender address (e.g., see FIG. 11 embodiment). In some such embodiments monitoring for a period of time to detect receipt of a response to said message directed to the sender address includes: monitoring for an update response message in response to said update request. In some embodiments making, when the monitoring detects receipt of a response to said message directed to said sender address, a determination as to whether said first invite message does not correspond to a malicious operation or may correspond to a malicious operation based on the detected response includes: determining that the first invite message does not correspond to a malicious operation when a valid update response message is received in response to said update request message.

In some embodiments sending a message directed to the sender address in response to said first invite message includes: sending a success message (e.g. SIP 200 OK) directed to the sender address (see FIG. 14 embodiment). In some such embodiments monitoring for a period of time to detect receipt of a response to said message directed to the sender address includes: monitoring for an acknowledgement message in response to said success message. In some such embodiments making, when said monitoring detects receipt of a response to said message directed to said sender address, a determination as to whether said first invite message does not correspond to a malicious operation or may correspond to a malicious operation based on the detected response includes: checking the amount of time between sending of said success message and receipt of said acknowledgement message, e.g., determining if the acknowledgement message is received within an expected amount of time of sending the success message where the expected amount of time. Such a determination may be implemented as a time out period with a timer being set upon the sending of the success message and the timer expiring if an acknowledgement message is not received within the expected amount of time. In some such embodiments making a determination as to whether said first invite message does not correspond to a malicious operation or may correspond to a malicious operation based on the detected response further includes: i) determining that said first invite message does not correspond to a malicious operation when an acknowledgement message is received in response to said success message within an expected amount of time (e.g., a predetermined amount of time that may be known or pre-configured based on network characteristics); and ii) determining that said invite message may correspond to a malicious operation when it is determined that said acknowledgement message is not received within said expected amount of time. In some such embodiments the exemplary method further comprises: terminating a call being established in response to said first invite message when it is determined that said acknowledgement message is not received within said expected amount of time.

In some embodiments the method further includes: checking if the first invite message is defective or includes a sender address on a list of suspect addresses (e.g., list of addresses which are known addresses from which malicious, e.g., spoofing, messages or denial of service attached originate or which have been listed as being of concern for another reason); and determining the type of message to send in response to said first invite message based on said check.

In some embodiments the method further comprises, prior to receiving said first invite message: receiving a first registration message from a registering entity seeking to perform a session initiation protocol registration, said first registration message including a second sender address (see FIG. 4 embodiment); sending a registration response message to said second sender address included in the first registration message in response to said first registration message including a registration lifetime; monitoring to detect a second registration message from said registering entity prior to expiration of said registration lifetime; and making a decision as to whether or not the first registration message may correspond to a malicious operation based on whether said monitoring detects said second registration message prior to expiration of said lifetime. In some such embodiments making a decision as to whether or not the first registration message may correspond to a malicious operation based on whether said monitoring detects said second registration message prior to expiration of said lifetime includes: determining that said first registration message may correspond to a malicious operation when said second registration message is not detected within said registration lifetime; and determining that said first registration message does not correspond to a malicious operation when said second registration message is detected within said registration lifetime. In some embodiments the registration lifetime is less than 20 seconds. In some other embodiments the registration lifetime is less than 10 seconds, or less than 5 seconds, e.g., 4 or fewer seconds. In some embodiments when it is determined that the first registration message corresponds to a malicious operation, performing the steps of: sending a test message to the address and port combination which is the indicated source of said first registration message; monitoring to detect a reply to said test message; and including in said set of network information indicating whether or not a reply was received to said test message.

The original INVITE/REGISTER request received by an SBC can be relayed to core network elements or the call/registration can be treated as a test procedure by NBS and the received INVITE/REGISTER is not relayed to core network. In the no-relay case, all the messages/responses are generated by SBC.

If, as a result of the test procedures, no reply is received for a test or other message sent by SBC for which a reply is expected, the SBC can, and in some embodiments does, send a test message directed to an address in an invite or register signal. Such a message is independent of the call/registration signal and/or response sand is sent to probe whether a device will send a reply. In this manner it is possible to test whether there is a device as the source and port from which a register or call setup message was received. If a reply to the test message is received it indicates that a device is present but if no reply is received it indicates that there is no device at the tested address and port combination and that future requests and or signals having that port/address combination indicated as a source should be subject to blacklisting and dropped, ignored or trigger an alarm.

According to the result of the test message sent to the identified sender of an INVITE/REGISTER message which failed a test in terms of an expected response or signal, the sender will be classified in the "expected responses received"/"expected responses not received, independent reply received"/"expected responses not received, independent reply not received" category depending on the set of signals and/or responses that were received.

Figure 18:
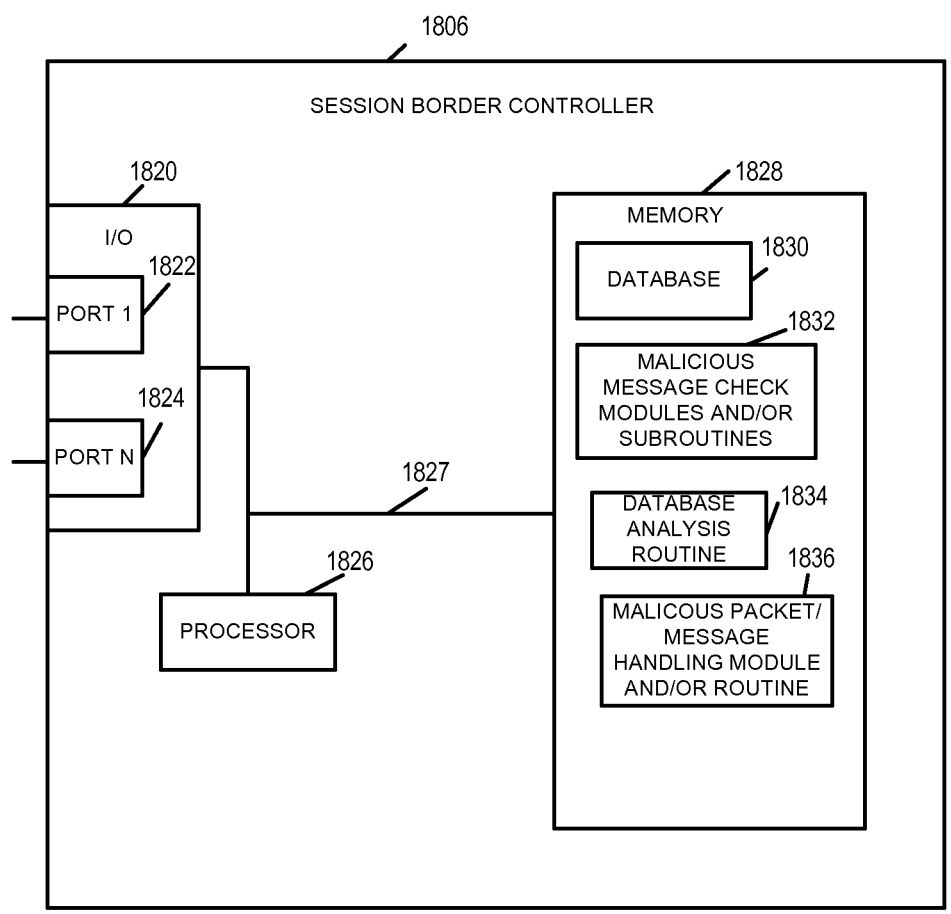
FIG. 18 illustrates an exemplary session border controller that implements the method of the present invention and can be used as the session border controller shown in FIG. 1 or any of the other figures.

FIG. 18 illustrates an exemplary session border controller 1806 that implements the method of the present invention and can be used as the session border controller 106 shown in FIG. 1 or any of the other figures.

The SBC 1806 includes an input/output interface 1820 including a plurality of ports 1822, 1824 which coupled the SBC 1806 to user devices 110, 102, 112, SIP register and/or application server 108 and/or one or more other devices in the network 100. The SBC 1806 further includes a bus 1827 which coupled the I/O interface 1820 to a processor 1826 and memory 1828. The processor 1826 controls the SBC 1806 controls the SBC to operate in accordance with the invention and implement one or more of the routines and/or subroutines shown in the present application. The memory includes a database 1830 which may be the same as or similar to the database 1700 shown in FIG. 17, one or more malicious message check modules and/or subroutines 1832. The routines and/or subroutines 1832 include code corresponding to the subroutines and routines shown in the other figures of the application and, when executed, by the processor 1826 control the SBC to operate in accordance with the invention. Memory 1828 includes, in some embodiments, a separate module or routine corresponding to each routine and/or subroutine shown in the other figures of the present application.

Database analysis routine 1834, when executed by the processor 1826, performs analysis on the information included in database 1830 to identify common features of detected malicious packets and/or messages, e.g., in the manner described above. Malicious packet/message handling module and/or routine when executed by the processor 1826 controls the session border to control to drop, disregard and/or generate alerts in response to detecting malicious packets. In some embodiments malicious packet detection is based on common features of previously detected malicious packets, e.g., packets determined to be malicious based on the failure to detect an expected response or action in response to a signal sent to the source IP address and/or port of a received packet or message.

While shown as modules or routines in memory, the routines and/or subroutines of the present invention are sometimes implemented in hardware, e.g., as ASICs or other circuits. In such embodiment a circuit is used in place of a routine or subroutine. Thus in at least some embodiments the implementation is made fully in hardware.

In some embodiments the I/O interface 1820 is configured to implement the receiving and sending steps performed by the SBC 106 or 1806 while the processor 1826 is configured to perform other steps such as the monitoring steps and decision making steps performed by the SBC. The processor 1820 is also configured to generate and update the database 1830 (which may be the same as database 1700) and handle malicious packets, e.g., by dropping packets.

While reference is made in various places to determining that a packet or message may correspond to a malicious operation it should be appreciated that in at least some embodiments such a determination may presume that packets and/or messages which may correspond to a malicious operation do in fact correspond to a malicious operation. Thus, in at least some embodiments packets/messages which are determined to possibly correspond to a malicious operation, e.g., which may correspond to a malicious operation, are declared and/or determined to correspond to a malicious operation to default on the side of safety. However, such an approach need not be taken in all embodiments. Thus, in some embodiments a determination that a packet may correspond to a malicious operation should and will be interpreted as a decision or determination that a packet does correspond to a malicious operation.

In various embodiments a device of any of one or more of Figures, e.g., session border controller or other device, includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., border controllers, telecommunications systems, network nodes and/or network equipment devices. Various embodiments are also directed to methods, e.g., method of controlling and/or operating border controllers, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, message reception, spoofing check, signal processing, and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., session border controllers. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node such as a session border controller, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a Session Border Controller, the method comprising:
receiving, via an interface of the Session Border Controller, a first invite message including sender contact information including a sender address, said sender address including an Internet Protocol (IP) port;
sending, by said Session Border Controller, a message directed to said sender address in response to said first invite message;
monitoring, by said Session Border Controller, for a period of time to detect receipt of a response to said message directed to said sender address;
making, by said Session Border Controller when said monitoring detects receipt of a response to said message directed to said sender address, a determination as to whether said first invite message does not correspond to a malicious operation or does correspond to a malicious operation based on the detected response; and
prior to receiving said first invite message:
receiving, at the Session Border Controller, a first registration message destined for a session initiation protocol (SIP) registrar from a registering entity seeking to perform a session initiation protocol registration, said first registration message including a second sender address, said second sender address including a second IP port; and
making, by the Session Border Controller, a decision as to whether or not the first registration message corresponds to a malicious operation without said Session Border Controller relaying the first registration message to said session initiation protocol registrar, said making said decision including:
generating, by the Session Border Controller, a registration response message in response to said first registration message, said registration response message including a registration lifetime;
sending, by the Session Border Controller, said generated registration response message to said second sender address included in the first registration message;
monitoring, by the Session Border Controller, to detect a second registration message from said registering entity prior to expiration of said registration lifetime; and
making, by the Session Border Controller, said decision as to whether or not the first registration message corresponds to a malicious operation based on whether said monitoring detects said second registration message prior to expiration of said registration lifetime, said making said decision including:
determining that said first registration message corresponds to a malicious operation when said second registration message is not detected within said registration lifetime; and
determining that said first registration message does not correspond to a malicious operation when said second registration message is detected within said registration lifetime.

2. The method of claim 1 wherein said sender address also includes an IP address, said method further comprising:
making, by the Session Border Controller when said monitoring does not detect a response to said message directed to said sender address, a determination that said received first invite message does correspond to a malicious operation.

3. The method of claim 2, further comprising:
updating a set of network information when it is determined that said received first invite message does correspond to a malicious operation.

4. The method of claim 3,
wherein said sending the message to said sender address in response to said first invite message includes sending a redirect message including an actual address and port of the Session Border Controller to which communication is being redirected; and
wherein said monitoring by the Session Border Controller for a period of time to detect receipt of a response to said message directed to said sender address includes monitoring for a second invite message corresponding to said sender address sent in response to said redirect message to the actual address and port of the Session Border Controller included in the redirect message.

5. The method of claim 4, wherein said step of making a determination as to whether said first invite message does not correspond to a malicious operation or does correspond to a malicious operation based on the detected response, includes:
checking if the second invite message includes a nonce included in said redirect message by said Session Border Controller; and
determining that said first invite message does correspond to a malicious operation when it is determined that said second invite message does not include said nonce that was included in the redirect message.

6. The method of claim 4 wherein when by said monitoring for a second invite message corresponding to said sender address sent in response to said redirect message said second invite message with said sender address is detected as being received at said Session Border Controller actual address and port included in the redirection message: (1) making a determination by the Session Border Controller that said first and said second invite messages do not correspond to a malicious operation and (2) proceeding with taking an action requested in the second invite message.

7. The method of claim 6 wherein the action requested in the second invite message is to establish a call in response to the second invite message.

8. The method of claim 4 further comprising:
determining, by the Session Border Controller, that said first invite message corresponds to a malicious operation when, subsequent to sending said redirect message to said sender address, said Session Border Controller detects a receipt of a third invite message including the sender address at the same Session Border Controller IP address and port at which the first invite message was received.

9. The method of claim 2,
wherein said sending a message directed to said sender address in response to said first invite message includes:
sending an update request message directed to said sender address; and
wherein said monitoring for a period of time to detect receipt of a response to said message directed to said sender address includes:
monitoring for an update response message in response to said update request.

10. The method of claim 9, wherein said making, by said Session Border Controller when said monitoring detects receipt of a response to said message directed to said sender address, a determination as to whether said first invite message does not correspond to a malicious operation or does correspond to a malicious operation based on the detected response includes:
determining that said first invite message does not correspond to a malicious operation when a valid update response message is received in response to said update request message.

11. The method of claim 1,
wherein said sending a message directed to said sender address in response to said first invite message includes:
sending a success message directed to said sender address; and
wherein said monitoring for a period of time to detect receipt of a response to said message directed to said sender address includes:
monitoring for an acknowledgement message in response to said success message.

12. The method of claim 11, wherein said making, when said monitoring detects receipt of a response to said message directed to said sender address, a determination as to whether said first invite message does not correspond to a malicious operation or does correspond to a malicious operation based on the detected response further includes:
determining that said first invite message does not correspond to a malicious operation when said acknowledgement message is received in response to said success message within an expected amount of time; and
determining that said invite message does correspond to a malicious operation when it is determined that said acknowledgement message is not received within said expected amount of time.

13. The method of claim 12, further comprising:
terminating a call being established in response to said first invite message when it is determined that said acknowledgement message is not received within said expected amount of time.

14. The method of claim 1, further comprising:
checking if the first invite message is defective or includes a sender address on a list of suspect addresses; and
determining a type of message to send in response to said first invite message based on said checking.

15. The method of claim 1, wherein said registration lifetime is less than 20 seconds.

16. A Session Border Controller, comprising:
a hardware processor; and
an interface configured to:
receive a first invite message including sender contact information including a sender address, said sender address including an Internet Protocol (IP) port;
send a message directed to said sender address in response to said first invite message, said message directed to said sender address having been generated by said hardware processor; and
said hardware processor configured to:
monitor for a period of time to detect receipt of a response to said message directed to said sender address;
make, when said monitoring detects receipt of a response to said message directed to said sender address, a determination as to whether said first invite message does not correspond to a malicious operation or does correspond to a malicious operation based on the detected response;
make, when said monitoring does not detect a response to said message directed to said sender address, a determination that said received first invite message does correspond to a malicious operation; and prior to receiving said first invite message:
  receive a first registration message destined for a session initiation protocol (SIP) registrar from a registering entity seeking to perform a session initiation protocol registration, said first registration message including a second sender address, said second sender address including a second IP port; and
  make a decision as to whether or not the first registration message corresponds to a malicious operation without said Session Border Controller relaying the first registration message to said session initiation protocol registrar, said make said decision including:
    generate a registration response message in response to said first registration message, said registration response message including a registration lifetime;
    send said registration response message, to said second sender address included in the first registration message, in response to said first registration message;
    monitor to detect a second registration message from said registering entity prior to expiration of said registration lifetime; and
    make said decision as to whether or not the first registration message does correspond to a malicious operation based on whether said monitoring detects said second registration message prior to expiration of said registration lifetime, said make said decision as to whether or not the first registration message does correspond to a malicious operation based on whether said monitoring detects said second registration message prior to expiration of said registration lifetime including:
      determining that said first registration message does correspond to a malicious operation when said second registration message is not detected within said registration lifetime; and
      determining that said first registration message does not correspond to a malicious operation when said second registration message is detected within said registration lifetime.

17. A method of operating a Session Border Controller, comprising:
  receiving, by the Session Border Controller, a first registration message from a registering entity destined for a session initiation protocol registrar seeking to perform a session initiation protocol registration, said first registration message including a sender address, said sender address including an Internet Protocol (IP) port;
  comparing, by said Session Border Controller, said sender address to a list of addresses previously identified as corresponding to suspicious operations; and
  when said sender address matches an address on said list making, by said Session Border Controller, a decision as to whether or not the first registration message corresponds to a malicious operation without said Session Border Controller relaying the first registration message to said session initiation protocol registrar, said making a decision including:
    generating, by the Session Border Controller, a registration response message in response to said first registration message, said registration response message including a registration lifetime;
    sending said registration response message to said sender address included in the first registration message in response to said first registration message;
    monitoring to detect a second registration message from said registering entity prior to expiration of said registration lifetime; and
    making said decision as to whether or not the first registration message corresponds to a malicious operation based on whether said monitoring detects said second registration message prior to expiration of said registration lifetime, said making said decision as to whether or not the first registration message corresponds to a malicious operation based on whether said monitoring detects said second registration message prior to expiration of said registration lifetime including: (i) determining that said first registration message does correspond to a malicious operation when said second registration message is not detected within said registration lifetime and (ii) determining that said first registration message does not correspond to a malicious operation when said second registration message is detected within said registration lifetime.

18. The method of claim 17, wherein said registration lifetime is less than 20 seconds.

19. The method of claim 17, further comprising:
  updating a set of network information when it is determined that said received first registration message does correspond to a malicious operation.

20. A Session Border Controller, comprising:
  a hardware processor; and
  an interface configured to:
    receive a first registration message destined for a session initiation protocol registrar from a registering entity seeking to perform a session initiation protocol registration, said first registration message including a sender address, said sender address including an Internet Protocol (IP) port; and
    send a registration response message to said sender address included in the first registration message in response to said first registration message, said registration response message having been generated by said hardware processor; and
  said hardware processor configured to:
    make a decision as to whether or not the first registration message corresponds to a malicious operation without said Session Border Controller relaying the first registration message to said session initiation protocol registrar, said make said decision including:
      generate a registration response message in response to said first registration message, said registration response message including a registration lifetime;
      control said interface to send said generated registration response message to said sender address included in the first registration message;
      monitor to detect a second registration message from said registering entity prior to expiration of said registration lifetime; and
      make said decision as to whether or not the first registration message corresponds to a malicious operation based on whether said monitoring detects said second registration message prior to expiration of said registration lifetime, said make said decision as to whether or not the first registration message corresponds to a malicious operation based on whether said monitoring detects said second registration message prior to expiration of said registration lifetime including: (i) determining that said first registration message does correspond to a malicious operation when said second registration message is not detected within said registration lifetime and (ii) determining that said first registration message does not correspond to a malicious operation when said second registration message is detected within said registration lifetime.

\* \* \* \* \*